US008402487B2

(12) United States Patent  (10) Patent No.: US 8,402,487 B2
Icho  (45) Date of Patent: Mar. 19, 2013

(54) PROGRAM SELECTION SUPPORT DEVICE

(75) Inventor: Keiji Icho, Osaka (JP)

(73) Assignee: Panasonic Corporation, Osaka (JP)

( * ) Notice: Subject to any disclaimer, the term of this patent is extended or adjusted under 35 U.S.C. 154(b) by 836 days.

(21) Appl. No.: 11/628,490

(22) PCT Filed: Jun. 8, 2005

(86) PCT No.: PCT/JP2005/010472
§ 371 (c)(1),
(2), (4) Date: May 17, 2007

(87) PCT Pub. No.: WO2005/122579
PCT Pub. Date: Dec. 22, 2005

(65) Prior Publication Data
US 2007/0211158 A1  Sep. 13, 2007

(30) Foreign Application Priority Data
Jun. 8, 2004  (JP) .................................. 2004-170398

(51) Int. Cl.
*H04N 5/445*  (2011.01)
(52) U.S. Cl. .................. 725/45; 725/44; 725/9; 725/14; 725/46
(58) Field of Classification Search ............... 725/37–61
See application file for complete search history.

(56) References Cited

U.S. PATENT DOCUMENTS

| 5,686,954 | A | | 11/1997 | Yoshinobu et al. |
| 5,727,060 | A | * | 3/1998 | Young ............................ 348/734 |
| 5,790,935 | A | * | 8/1998 | Payton ............................. 725/91 |
| 5,798,785 | A | * | 8/1998 | Hendricks et al. ............... 725/46 |
| 6,177,931 | B1 | * | 1/2001 | Alexander et al. .............. 725/52 |
| 6,268,849 | B1 | * | 7/2001 | Boyer et al. ..................... 725/40 |
| 6,530,083 | B1 | * | 3/2003 | Liebenow ........................ 725/46 |
| 6,637,029 | B1 | * | 10/2003 | Maissel et al. .................. 725/46 |
| 6,973,663 | B1 | * | 12/2005 | Brown et al. .................... 725/39 |
| 7,209,942 | B1 | | 4/2007 | Hori et al. |
| 7,454,775 | B1 | * | 11/2008 | Schaffer et al. ................. 725/46 |
| 2003/0149988 | A1 | * | 8/2003 | Ellis et al. ........................ 725/87 |
| 2005/0010955 | A1 | * | 1/2005 | Elia et al. ......................... 725/88 |
| 2006/0173888 | A1 | | 8/2006 | Narahara et al. |

FOREIGN PATENT DOCUMENTS

| JP | 07-135621 | 5/1995 |
| JP | 08-102922 | 4/1996 |
| JP | 11-308581 | 11/1999 |
| JP | 2000-250944 | 9/2000 |
| JP | 2000-261733 | 9/2000 |
| JP | 2001-275056 | 10/2001 |
| JP | 2002-171231 | 6/2002 |
| JP | 2003-018492 | 1/2003 |
| JP | 2004-072186 | 3/2004 |

(Continued)

*Primary Examiner* — Nicholas Corbo
(74) *Attorney, Agent, or Firm* — Wenderoth, Lind & Ponack, L.L.P.

(57) ABSTRACT

When searching for programs similar to a program designated by a viewer, a program selection support device not only searches for similar programs based on program-related information such as program contents, but also determines an algorithm used for similarity judgment based on viewer-related information, such as a program viewing history of a viewer, personal information of the viewer, evaluations by other viewers, and information added by a program producer, or based on a category of the designated program, and searches for similar programs using the determined algorithm. The program selection support device displays the programs found as a result of the search.

24 Claims, 31 Drawing Sheets

| | FOREIGN PATENT DOCUMENTS | | WO | 2004/107743 | 12/2004 |
|---|---|---|---|---|---|
| WO | WO 03034716 A1 * | 4/2003 | | | |
| WO | 03/094508 | 11/2003 | * cited by examiner | | |

FIG. 2

| SIMILAR PROGRAM | SEGMENT INFORMATION | BROADCAST DATE AND TIME | SEGMENT START TIME |
|---|---|---|---|
| TODAY'S NEWS | A WHALE WAS BEACHED ON THE SHORE ··· | — | 00:35:00 |
| FISHERY REVITALIZATION | BAITFISH FOR WHALES ··· | 3/15 21:00 21ch | 00:21:00 |
| LIFE OF A WHALE | IN THE SEAS OF THE WORLD ···, WHALES ARE ··· | — | 00:00:05 |
| SEA MAMMAL | DOLPHINS AND WHALES ARE ··· | 3/17 15:00 19ch | 01:05:00 |
| ··· | ··· | ··· | ··· |

FIG. 6

| PROGRAM ID 9101 | BROADCAST DATE 9102 | BROADCAST START TIME 9103 | BROADCAST END TIME 9104 | CHANNEL 9105 | BROADCAST STATION 2601/9106 |
|---|---|---|---|---|---|
| ... | ... | ... | ... | ... | ... |
| 000111 | 2004/03/03 | 19:00 | 20:00 | 008 | TOKYO TV |
| ... | ... | ... | ... | ... | ... |
| 000112 | 2004/03/03 | 19:00 | 22:00 | 008 | OSAKA TV |
| ... | ... | ... | ... | ... | ... |
| 005234 | 2004/03/10 | 19:00 | 20:00 | 255 | SATELLITE |
| 005124 | 2004/03/10 | 20:00 | 23:00 | 255 | SATELLITE |

| GENRE 2601/9106 | LANGUAGE 2602 | TITLE 9107 | PROGRAM CONTENTS 9108 |
|---|---|---|---|
| ... | ... | ... | ... |
| DRAMA | JAPANESE | DRAMA ABC | FEATURES SIX FRIENDS LIVING IN NY ... |
| ... | ... | ... | ... |
| SPORTS | JAPANESE/ENGLISH | PROFESSIONAL BASEBALL | SECOND LEAGUE GAME: YANKEES VS DEVILS |
| ... | ... | ... | ... |
| SOCIETY/REPORT | ENGLISH | WORLD NEWS | TODAY'S EVENTS AND WEATHER |
| DOCUMENTARY | JAPANESE | ANIMAL WORLD | ON THE LAND, ..., IN THE SEA, ... |

| PROGRAM ID 9101 | SEGMENT NUMBER 9201 | SEGMENT START TIME (HOURS: MINUTES: SECONDS) 9202 | SEGMENT COMMENT 9203 |
|---|---|---|---|
| 005124 | 001 | 00:00:00 | DOG |
| 005124 | 002 | 00:30:00 | CAT |
| 005124 | 003 | 01:10:00 | WHALE |
| ... | ... | ... | ... |
| 005125 | | | |
| 005126 | | | |
| ... | | | |

| ITEM | CONTENTS |
|---|---|
| USER ID | U000110 |
| SEX | MALE |
| AGE | 31 |
| LANGUAGE | JAPANESE/ENGLISH |
| ... | ... |
| FAVORITE MUSIC | JAZZ |
| FAVORITE SPORTS | BASEBALL |
| ... | ... |
| VIEWING GENRE 1 | SOCIETY/REPORT |
| VIEWING GENRE 2 | DOCUMENTARY |
| ... | ... |
| RECORDING GENRE 1 | SOCIETY/REPORT |
| RECORDING GENRE 2 | SPORTS |
| ... | ... |
| EVALUATION GENRE 1 | SPORTS |
| EVALUATION GENRE 2 | VARIETY SHOW |
| ... | ... |
| KEYWORD 1 | STOCK PRICE |
| KEYWORD 2 | DISTRIBUTION |
| ... | ... |
| PROFILE TYPE | P05 |

FIG. 9

| PROGRAM ID | DESIGNATED TIME | SEGMENT NUMBER |
|---|---|---|
| 005124 | 01:20:00 | 003 |

FIG. 10

| PROGRAM ID /9101 | TITLE /9107 | SEGMENT NUMBER /9201 | BROADCAST STATION /2601 | GENRE /9106 | LANGUAGE /2602 |
|---|---|---|---|---|---|
| 002112 | SEA MAMMAL | 030 | TOKYO TV | DOCUMENTARY | JAPANESE/ENGLISH |
| 004321 | LIFE OF A WHALE | 001 | OSAKA TV | DOCUMENTARY | JAPANESE |
| ... | ... | ... | ... | ... | ... |
| 006111 | TODAY'S NEWS | 011 | KANTO TV | SOCIETY/REPORT | ENGLISH |
| 006121 | FISHERY REVITALIZATION | 012 | SATELLITE | SOCIETY/REPORT | JAPANESE |
| ... | ... | ... | ... | ... | ... |

| PROGRAM ID | BROADCAST DATE | GENRE | SCHEDULE RECORDING | PLAYBACK |
|---|---|---|---|---|
| ... | ... | ... | ... | ... |
| 004321 | 2004/01/23 | VARIETY SHOW | RECORDED | PLAYED |
| 005124 | 2004/03/03 | DOCUMENTARY | RECORDED | NOT PLAYED |
| ... | ... | ... | ... | ... |
| 000112 | 2004/03/31 | SPORTS | RECORDED | NOT PLAYED |
| 001101 | 2004/04/01 | SOCIETY/REPORT | SCHEDULE RECORDED | |
| ... | ... | ... | ... | ... |

| PROFILE TYPE (5151) | PROGRAM ID (9101) | PROGRAM PRESS COUNT (1711) | SEGMENT NUMBER (9201) | SEGMENT PRESS COUNT (1712) | SEGMENT START TIME (1713) |
|---|---|---|---|---|---|
| P01 | 000111 | 15000 | 030 | 4000 | 19:55:00 |
|  |  |  | 003 | 3800 | 19:33:00 |
|  |  |  | 001 | 3200 | 19:30:00 |
|  |  |  | ... | ... | ... |
|  | 023456 | 13300 | 100 | 6010 | 22:30:20 |
|  |  |  | 050 | 2500 | 21:10:00 |
|  |  |  | 061 | 2000 | 21:35:00 |
|  |  |  | ... | ... | ... |
|  | ... | ... | ... | ... | ... |
| P02 |  |  |  |  |  |
| ..... |  |  |  |  |  |

| PROFILE TYPE | SEX | AGE | ... | RECORDING GENRE 1 | ... |
|---|---|---|---|---|---|
| P01 | FEMALE | 20-29 | ... | SOCIETY/REPORT | ... |
| ... | ... | ... | ... | ... | ... |
| P20 | MALE | 40-49 | ... | SPORTS | ... |

FIG. 29

| PROFILE TYPE | PROGRAM ID : 000111 SEGMENT NUMBER : 001 | 000111 002 | ... | 005124 002 | ... | 005124 068 | ... |
|---|---|---|---|---|---|---|---|
| P01 | 3200 | 300 | ... | 40 | ... | 70 | ... |
| P02 | 30 | 6 | ... | 501 | ... | 400 | ... |
| ... | ... | ... | ... | ... | ... | ... | ... |
| P05 | 100 | 15 | ... | 350 | ... | 600 | ... |
| ... | ... | ... | ... | ... | ... | ... | ... |
| P20 | 0 | 0 | ... | 2523 | ... | 3200 | ... |

(UNIT: PRESS COUNT)

PROGRAM SELECTION SUPPORT DEVICE

TECHNICAL FIELD

The present invention relates to information provision techniques that are useful for program selection when viewing broadcast programs and recorded programs, and especially relates to techniques of providing information about similar programs.

BACKGROUND ART

In recent years, as a result of the development of broadcasting technologies, a wide variety of programs are broadcast on a large number of channels not only by terrestrial broadcasting but also by CATV (Cable Television), satellite broadcasting, and the like. Also, as a result of the development of recording technologies, a large number of programs are automatically recorded onto a large-capacity storage medium.

In such a situation where many programs are available for viewing, there is a technique of selecting, based on program-related information such as an EPG (Electric Program Guide) transmitted together with video, audio, etc. of a program, similar programs that relate to the program and presenting the selected programs. According to this technique, the similar programs are selected by extracting keywords that characterize the program from the program-related information, and calculating a degree of similarity between programs using the keywords through numerical conversion. Also, a degree of similarity between programs is calculated with weights assigned to the keywords being varied according to program genre or the like.

Such a technique helps the viewer easily know the programs similar to the program, when he or she wants to know more about the program.

DISCLOSURE OF THE INVENTION

Problems the Invention is Going to Solve

However, when searching for the similar programs, the similarity between programs is judged based on the program contents. The similar programs found in such a way tend to include many programs which the viewer never watches.

Also, due to recent increases in the number of channels, hundreds and thousands of programs are subjected to the search. As a result, a large number of programs are retrieved as the similar programs. This makes it difficult for the viewer to find a program which he or she wants to watch.

In view of this, the present invention aims to provide a program selection support device that can search for similar programs more desired by the viewer and present the programs to the viewer.

Means of Solving the Problems

The stated aim can be achieved by a program selection support device including: a program information acquisition unit operable to acquire program information of each of a plurality of programs, the program information including an element used for a predetermined similarity judgment; a viewer information acquisition unit operable to acquire viewer information relating to a viewer; a program designation unit operable to designate a program; a determination unit operable to determine an algorithm used for the similarity judgment, based on the viewer information acquired by the viewer information acquisition unit; a search unit operable to search for programs similar to the program designated by the program designation unit using the algorithm determined by the determination unit, with reference to the program information acquired by the program information acquisition unit; and a display unit operable to display program identification information for identifying the programs found by the search unit.

Effects of the Invention

According to this construction, the similarity between programs is judged based on not only the program-related information but also the viewer-related information such as a viewing history. This makes it possible to retrieve and present similar programs more desired by the viewer.

In the program selection support device, the program information acquisition unit operable to acquire the program information is realized by reading information stored in a program information storage unit 1600 shown in FIG. 3. The viewer information acquisition unit operable to acquire viewer information is realized by reading information stored in a profile information storage unit 1500 or by a condition input unit 2300. The program designation unit is realized by a user interface unit 2400. The determination unit operable to determine an algorithm used for the similarity judgment is realized by a profile-specific criterion determination unit 2250. The search unit operable to search for programs similar to the program is realized by a similar program search unit 2200 and especially by a similarity judgment unit 2260. The display unit operable to display program identifiers is realized by a similar program display unit 2100.

Here, the program designated by the program designation unit may be made up of a plurality of segments having different playback times, wherein the program information acquired by the program information acquisition unit further includes segment information for specifying each segment, the program designation unit further designates segment information specifying a segment in the designated program, the search unit searches for the programs that include segments similar to the segment specified by the segment information designated by the program designation unit using the algorithm determined by the determination unit, with reference to the program information acquired by the program information acquisition unit, and the display unit displays the program identification information for identifying the programs found by the search unit, and segment identification information for identifying the segments similar to the specified segment.

According to this construction, the viewer can know which part of a program is similar to the designated program. This enables the viewer to view from the similar part, with there being no need to start viewing from the beginning of the program.

Here, the program information acquired by the program information acquisition unit may be information created by a producer of a corresponding program.

According to this construction, similar programs can be selected in consideration of not only the program contents and the like but also the intension of the program producer. As a result, similar programs more desired by the viewer can be presented. For example, it is possible to present a program about a next episode or the like that can only be known by the producer, as a similar program.

Here, the program selection support device may further include: a recording unit operable to record a program, wherein if any of the programs found by the search unit has been recorded by the recording unit, the display unit displays recording information indicating that the program has been recorded, together with the program identification information.

According to this construction, the viewer can know which of the similar programs has already been recorded on his/her recording/playback device. Hence the viewer can watch the program at once, without having to check whether the program has been recorded or not.

The recording unit operable to record a program is realized by a recording/playback unit 2500 shown in FIG. 3.

Here, the search unit may further extract, for each of the programs found by the search unit, a reason why the program is similar to the program designated by the program designation unit, wherein the display unit displays information showing the extracted reason, together with the program identification information.

According to this construction, when presenting the similar programs to the viewer, the reasons for similarity a represented as well. This allows the viewer to easily select a program he/she wants to watch. For instance, the viewer can know which of the similar programs has the appearance of the same person as the designated program, without actually playing back the program.

Here, the display unit may further display a program guide, with parts of the program guide that show the programs found by the search unit being displayed in a different state from remaining parts that show other programs, wherein the program designation unit designates the program on the program guide displayed by the display unit.

According to this construction, it is possible to designate a program and know which programs are similar to the designated program on the program guide. Hence the viewer can easily select what he/she wants to watch. For example, if the viewer designates a sports analysis program which he/she wants to watch, other sports analysis programs are presented to the viewer. Thus, when the viewer wants to check two or more sports analysis programs for today's game, he/she can easily know sports analysis programs that are scheduled to be broadcast today.

Here, the program selection support device may further include: a viewing history acquisition unit operable to acquire viewing history information showing programs which have been viewed by the viewer, wherein the viewer information acquired by the viewer information acquisition unit is the viewing history information.

According to this construction, the viewing history of the viewer is taken into consideration when searching for similar programs. This allows the viewer to easily select a program similar to a program which he/she frequently watched in the past.

Here, the viewing history information may include genres of the viewed programs, wherein the viewer information acquired by the viewer information acquisition unit shows a genre, among the genres included in the viewing history information, which has been viewed by the viewer with a frequency higher than a predetermined frequency.

According to this construction, the program genre frequently watched by the viewer is taken into consideration when searching for similar programs. This makes it possible to retrieve and present similar programs more desired by the viewer. For example, programs of the frequently viewed genre may be given higher priorities when displaying the similar programs.

The viewing history acquisition unit operable to acquire viewing history information is realized by reading history information stored in a profile information storage unit 1500 shown in FIG. 3.

Here, the viewing history information may include keywords appearing in program information of the viewed programs, wherein the viewer information acquired by the viewer information acquisition unit shows a keyword, among the keywords included in the viewing history information, which appears at least a predetermined number of times in the program information of the viewed programs.

According to this construction, the keyword frequently appearing in the frequently viewed programs is taken into consideration when searching for similar programs. This makes it possible to retrieve and present similar programs more desired by the viewer. For example, the similarity between programs may be judged with a larger weight being assigned to the frequently appearing keyword.

Here, the program selection support device may further include: a personal information acquisition unit operable to acquire personal information of the viewer, wherein the viewer information acquired by the viewer information acquisition unit is the personal information.

According to this construction, the personal information of the viewer is taken into consideration when searching for similar programs. This allows the viewer to easily select a suitable program.

Here, the program information acquired by the program information acquisition unit may include language information for specifying a language used in a corresponding program, wherein the personal information acquired by the personal information acquisition unit includes information about a language usable by the viewer, and the viewer information acquired by the viewer information acquisition unit shows the language usable by the viewer.

According to this construction, the language usable by the viewer is taken into consideration when searching for similar programs. This makes it possible to retrieve and present similar programs more desired by the viewer. For example, programs of the viewer usable language may be given higher priorities when displaying the similar programs.

The personal information acquisition unit operable to acquire personal information is realized by reading information stored in the profile information storage unit 1500 shown in FIG. 3 or by the condition input unit 2300.

Here, the determination unit may determine the algorithm in accordance with a type based on the personal information of the viewer.

According to this construction, the similarity between programs is judged based on not only the program-related information but also the viewer-related information so as to use the similarity judgment algorithm corresponding to the type of the viewer. This makes it possible to retrieve and present similar programs more desired by the viewer.

Here, the program selection support device may further include: an evaluation acquisition unit operable to acquire evaluation information showing an evaluation of an other viewer on each of the plurality of programs, wherein the algorithm determined by the determination unit indicates that an evaluation of an other viewer of a same type as the viewer is no less than a predetermined evaluation.

According to this construction, the program evaluations by the other viewers are taken into consideration when searching for similar programs. This makes it possible to retrieve and present similar programs more desired by the viewer. For example, the similar programs may be displayed in such a display order that indicates the evaluations by the other viewers.

The evaluation acquisition unit operable to acquire evaluation information is realized by reading information stored in a ranking information storage unit 1700 shown in FIG. 3.

Here, the program information acquired by the program information acquisition unit may further include area information for specifying an area where a corresponding program is broadcast, wherein the program selection support device further includes: a location acquisition unit operable to acquire location information about a location of the program selection support device, and the viewer information acquired by the viewer information acquisition unit shows whether the location shown by the location information acquired by the location acquisition unit belongs to the area specified by the area information.

According to this construction, the availability of a program in an area where the viewer is present is taken into consideration when searching for similar programs. This makes it possible to retrieve and present similar programs more desired by the viewer. For example, the similar programs may be displayed so as to enable the viewer to know that they can be viewed in the area where he/she is present.

The location acquisition unit operable to acquire location information is realized by reading information stored in the profile information storage unit 1500 shown in FIG. 3 or by the condition input unit 2300.

Here, if the program selection support device has a plurality of viewers, the viewer information acquired by the viewer information acquisition unit may be summarized viewer information obtained by summarizing viewer information of each of the plurality of viewers, wherein the determination unit determines the algorithm used for the similarity judgment, based on the summarized viewer information.

According to this construction, when the plurality of viewers watch the television, similar programs that may be of interest to all of the plurality of viewers are presented. This allows the plurality of viewers to easily select a program for all of them to watch.

Here, the algorithm determined by the determination unit may be for searching, as the programs similar to the program designated by the program designation unit, for programs which are selected using a predetermined algorithm based on the program information acquired by the program information acquisition unit and which comply with the viewer information acquired by the viewer information acquisition unit.

According to this construction, not only is the similarity judgment performed based on the program-related information, but also similar programs are further narrowed down based on the viewer-related condition. This makes it possible to search for and present similar programs more desired by the viewer.

The stated aim can also be achieved by a program selection support device including: a program information acquisition unit operable to acquire program information of each of a plurality of programs, the program information including an element used for a predetermined similarity judgment; a program designation unit operable to designate a program; a category acquisition unit operable to acquire a category which is judged based on the program information acquired by the program information acquisition unit and to which the program designated by the program designation unit belongs; a determination unit operable to determine an algorithm used for the similarity judgment, based on the category acquired by the category acquisition unit; a search unit operable to search for programs similar to the program designated by the program designation unit using the algorithm determined by the determination unit, with reference to the program information acquired by the program information acquisition unit; and a display unit operable to display program identification information for identifying the programs found by the search unit.

According to this construction, when judging the similarity between programs, the algorithm used for the similarity judgment is changed depending on the feature of the category to which the program is classified depending on the program-related information. This makes it possible to search for and present similar programs more desired by the viewer.

Here, the program selection support device may further include: a category acquisition unit operable to acquire a category which is judged based on the program information acquired by the program information acquisition unit and to which the program designated by the program designation unit belongs, wherein the determination unit determines the algorithm used for the similarity judgment, based on the viewer information acquired by the viewer information acquisition unit and the category acquired by the category acquisition unit.

According to this construction, not only the viewer-related condition but also the feature of the category of the program is taken into consideration in the similarity judgment. This makes it possible to search for and present similar programs more desired by the viewer.

The category acquisition unit operable to acquire a category to which the designated program belongs is realized by a category judgment unit 8100 shown in FIG. 16. The search unit operable to search for similar programs based on the category is realized by a similar program search unit 8200. The determination unit operable to determine an algorithm used for the similarity judgment is realized by a category-specific criterion determination unit 8250. The search unit operable to search for similar programs is realized by the similar program search unit 8200 and especially by a similarity judgment unit 8260.

BRIEF DESCRIPTION OF THE DRAWINGS

FIG. 2 shows a structure and a specific example of a similar program list 3110.

FIG. 6 shows a structure and a specific example of program information.

FIG. 7 shows a structure and a specific example of segment information.

FIG. 8 shows a structure and a specific example of profile information.

FIG. 9 shows a structure and a specific example of program designation information.

FIG. 10 shows a structure and a specific example of a search result program list.

FIG. 11 shows a structure and a specific example of recorded program information.

FIG. 12 shows a structure and a specific example of ranking information.

FIG. 26 shows a structure and a specific example of profile type information.

FIG. 29 shows a structure and a specific example of overall ranking information.

Figure 1:
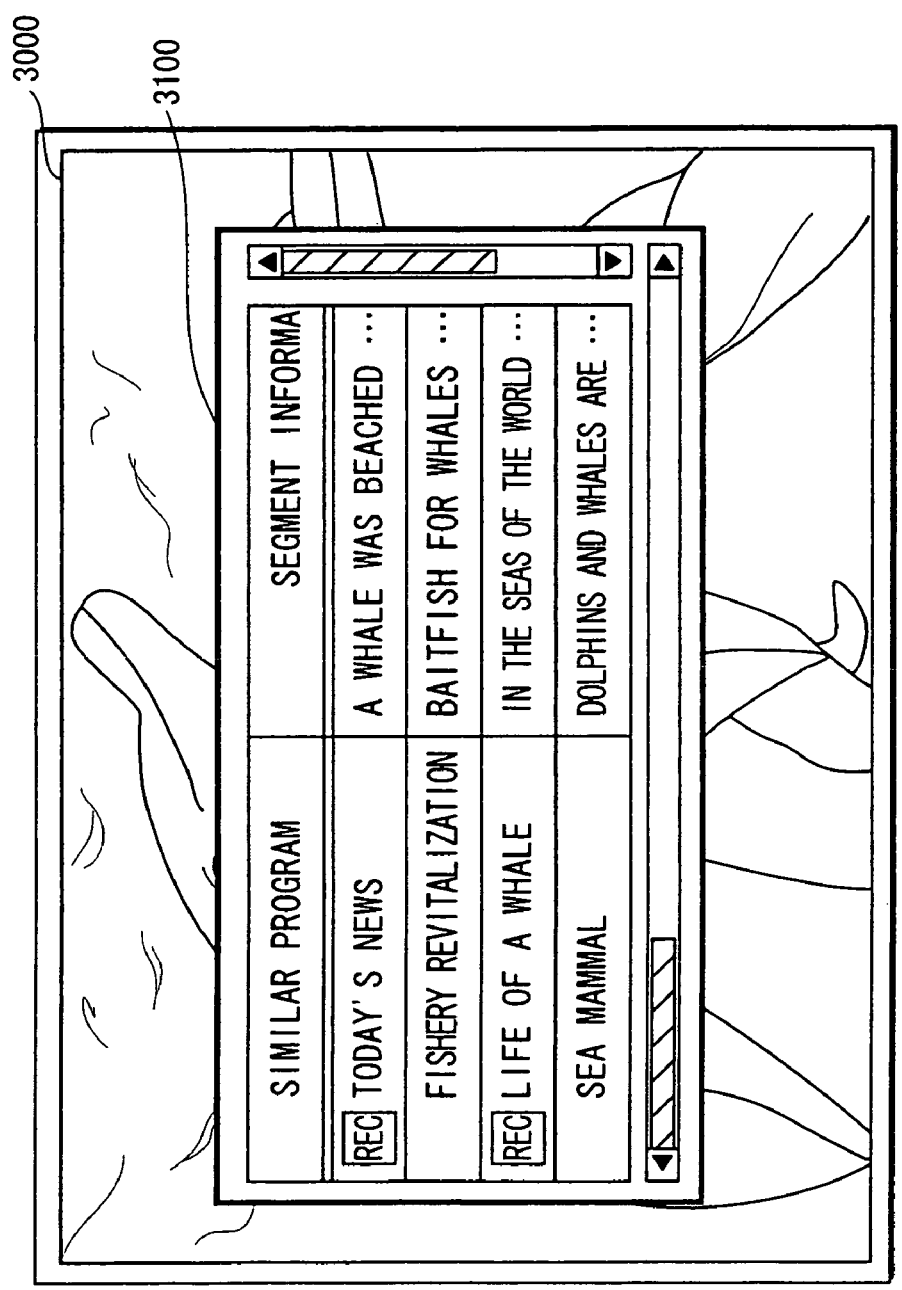
FIG. 1 shows an example of a similar program list screen displayed on a display of a recording/playback device.

DESCRIPTION OF REFERENCE NUMERALS 1000, 2000, 8000 . . . recording/playback device
1400 . . . evaluation information input unit
1500 . . . profile information storage unit
1510 . . . profile information
1600 . . . program information storage unit
1610 . . . recorded program information
1700 . . . ranking information storage unit
1900 . . . transmission/reception unit
2100 . . . similar program display unit
2200, 8200 . . . similar program search unit
2300 . . . condition input unit
4000 . . . network
5000 . . . service provision device
5100 . . . overall profile information storage unit
5200 . . . profile information collection unit
5400 . . . ranking generation unit
5500 . . . overall ranking information storage unit
5600 . . . ranking information extraction unit
5700 . . . transmission/reception unit
5800 . . . program information storage unit
8100 . . . category judgment unit

BEST MODE FOR CARRYING OUT THE INVENTION

First Embodiment

<Overview>

A program selection support device according to a first embodiment of the present invention not only judges similarity by comparison of a program genre, program contents, and the like but also searches for similar programs in consideration of viewer-related information such as the viewer's program preferences and location, and displays the similar programs.

Programs subjected to the search include both a program which is scheduled to be broadcast for viewing by the viewer and a program which has already been broadcast.

The program which is scheduled to be broadcast can be viewed in real time or schedule-recorded for later viewing. Also, the program which has already been broadcast can be viewed at once if it has been recorded by the viewer's recording device. Even if the program has not been recorded, the program can still be viewed through video rental, an internet, or the like.

In this embodiment, when a segment in a program is designated, a search is performed for programs including segments that are similar to the designated segment and the programs found as a result of the search are displayed as similar programs. Here, a segment is one of a plurality of meaningful portions that compose a program.

<Construction>

The program selection support device to which the present invention relates is described below, with reference to FIGS. 1 to 4.

FIG. 1 shows an example of a similar program list screen displayed on a display screen of a recording/playback device. A similar program list screen 3100 is overlaid on video which is being shown on a display screen 3000.

The similar program list screen 3100 is displayed on the display screen 3000 when the viewer designates a program and instructs to display the similar program list screen 3100. If information about all similar programs cannot be displayed at one time, a scroll bar is displayed on the similar program list screen 3100.

There are various methods for program designation, such as designating a program on a broadcast-scheduled program list displayed on the display screen 3000. In this embodiment, a program which is being played back when the viewer instructs to display the similar program list screen 3100 is used as a designated program, and a segment which is being played back when the viewer instructs to display the similar program list screen 3100 is used as a designated segment. Also, a program may be designated by selecting it from the similar programs displayed on the similar program list screen 3100. Which is to say, programs can be retrieved in a chained manner.

Also, there are various methods for instructing to display the similar program list screen 3100, such as selecting a menu item. In this embodiment, the instruction is made by pressing a specific button on a remote control.

FIG. 2 shows a structure and a specific example of a similar program list 3110.

The similar program list 3110 is a list displayed on the similar program list screen 3100. In view of a window size and a character size, only part of the list is displayed on the similar program list screen 3100, with the entire list being able to be seen by using the scroll bar.

The similar program list 3110 includes a similar program 3111, segment information 3112, a broadcast date and time 3113, and a segment start time 3114.

The similar program 3111 shows a title of a similar program. The mark "REC" on the left side of the title indicates that the program has already been recorded.

The segment information 3112 relates to a segment similar to the designated segment.

The broadcast date and time 3113 shows a date and time at which the program is to be broadcast, in a case where the program is a broadcast-scheduled program.

The segment start time 3114 shows a time at which the segment shown by the segment information 3112 starts, in a case where the program shown by the similar program 3111 is played back from the beginning.

As one example, the similar program 3111 "Today's News" has already been recorded, and a segment shown by the segment information 3112 starts when the segment start time 3114 "00:35:00", i.e. 35 minutes, has elapsed from the beginning of the news.

Note here that an already recorded program can be played back from a segment shown by the segment information 3112.

Figure 3:
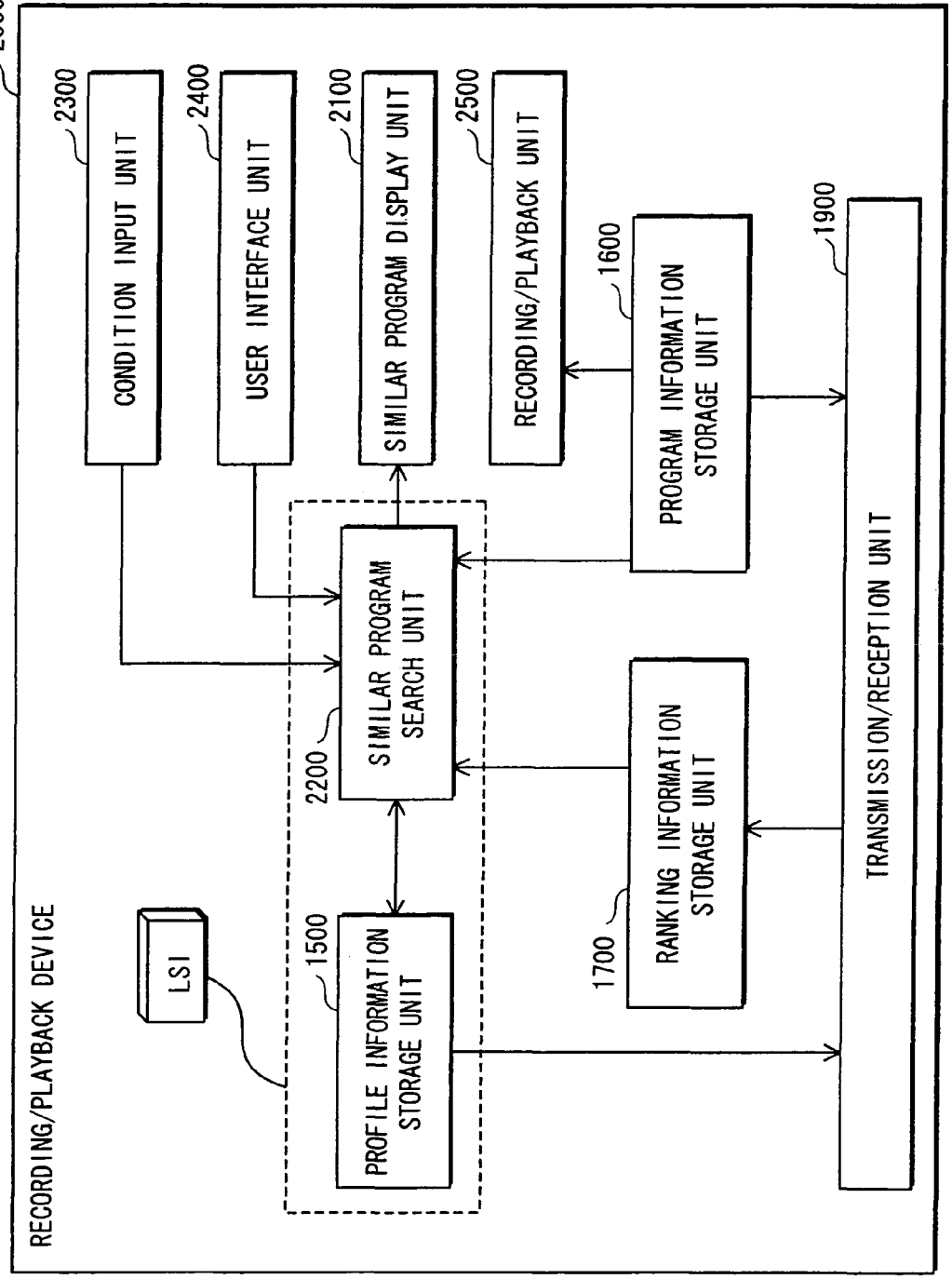
FIG. 3 is a functional block diagram showing a construction of a recording/playback device 2000 in a first embodiment.

FIG. 3 is a functional block diagram showing a construction of a recording/playback device according to the first embodiment.

A recording/playback device 2000 includes a similar program display unit 2100, a similar program search unit 2200, a condition input unit 2300, a user interface unit 2400, a recording/playback unit 2500, a profile information storage unit 1500, a program information storage unit 1600, a ranking information storage unit 1700, and a transmission/reception unit 1900.

Each function of the recording/playback device 2000 can be realized by a CPU executing a program stored on a memory or a hard disk (not illustrated) in the recording/playback device 2000.

The following explains each of the storage units. Details of information stored in these storage units will be explained later in the <Data> section, with reference to FIGS. 6 to 12.

The profile information storage unit 1500 has a function of storing profile information 1510 (see FIG. 8) of the viewer.

Here, the number of sets of profile information 1510 stored in the profile information storage unit 1500 is one, i.e. the profile information of the viewer of the recording/playback device 2000. If there are two or more viewers of the recording/playback device 2000 depending on a family structure or the like, a plurality of sets of profile information are stored in the profile information storage unit 1500 and a profile is selected according to circumstances. In this embodiment, however, the number of viewers is assumed to be one.

The program information storage unit 1600 has a function of storing program information 9100 (see FIG. 6) which is transmitted from a broadcast station in regard to programs scheduled to be broadcast, segment information 9200 (see FIG. 7), and recorded program information 1610 (see FIG. 11).

The program information 9100 has items such as a broadcast date and time, a synopsis, and a person, depending on the contents of each program. The program information 9100 includes not only information of a program which is scheduled to be broadcast, but also information of a program which was broadcast in the past. A time period covered by the program information 9100 can be determined based on an area, a storage capacity, a viewer instruction, or the like. In this embodiment, the program information 9100 covers a time period from the beginning of the last month to the last day of the broadcast schedule transmitted from the broadcast station.

The segment information 9200 is information about one segment of a program. The segment is one of a plurality of meaningful portions that compose the program. The segment may have a certain length such as several minutes, or may be one screen, i.e. one frame showing a painting.

For example, the segment is specified through analysis of closed caption information transmitted together with video and the like of the program, and extraction and analysis of a keyword included in audio of the program. The segment information may be transmitted having been contained in the program information of the program. In such a case, the transmitted segment information can be submitted to use.

The recorded program information 1610 is a list of programs including a program which has already been recorded and a program which is scheduled to be recorded.

The ranking information storage unit 1700 has a function of storing ranking information 1710 (see FIG. 12) which is a list of programs recommended to the viewer.

A recommended program referred to here is a program highly evaluated by other viewers having similar program preferences to the viewer.

The ranking information 1710 is generated by classifying viewers into types based on personal information and a program viewing history of each viewer and organizing evaluation rankings of programs and segments for each type. A method of generating the ranking information 1710 will be explained later.

The similar program display unit 2100 is described next.

The similar program display unit 2100 has a function of opening the similar program list screen 3100 on the display screen 3000 and displaying the similar program list 3110.

The similar program display unit 2100 receives the similar program list 3110 from the similar program search unit 2200 and displays the similar program list screen 3100 upon receipt of a display instruction.

The similar program search unit 2200 has a function of searching the program information 9100 stored in the program information storage unit 1600 for programs that are similar to the program designated by the viewer.

In this embodiment, similarity between programs is judged with reference to not only the program information 9100 but also information relating to the viewer. This is explained below by referring to FIG. 4.

Figure 4:
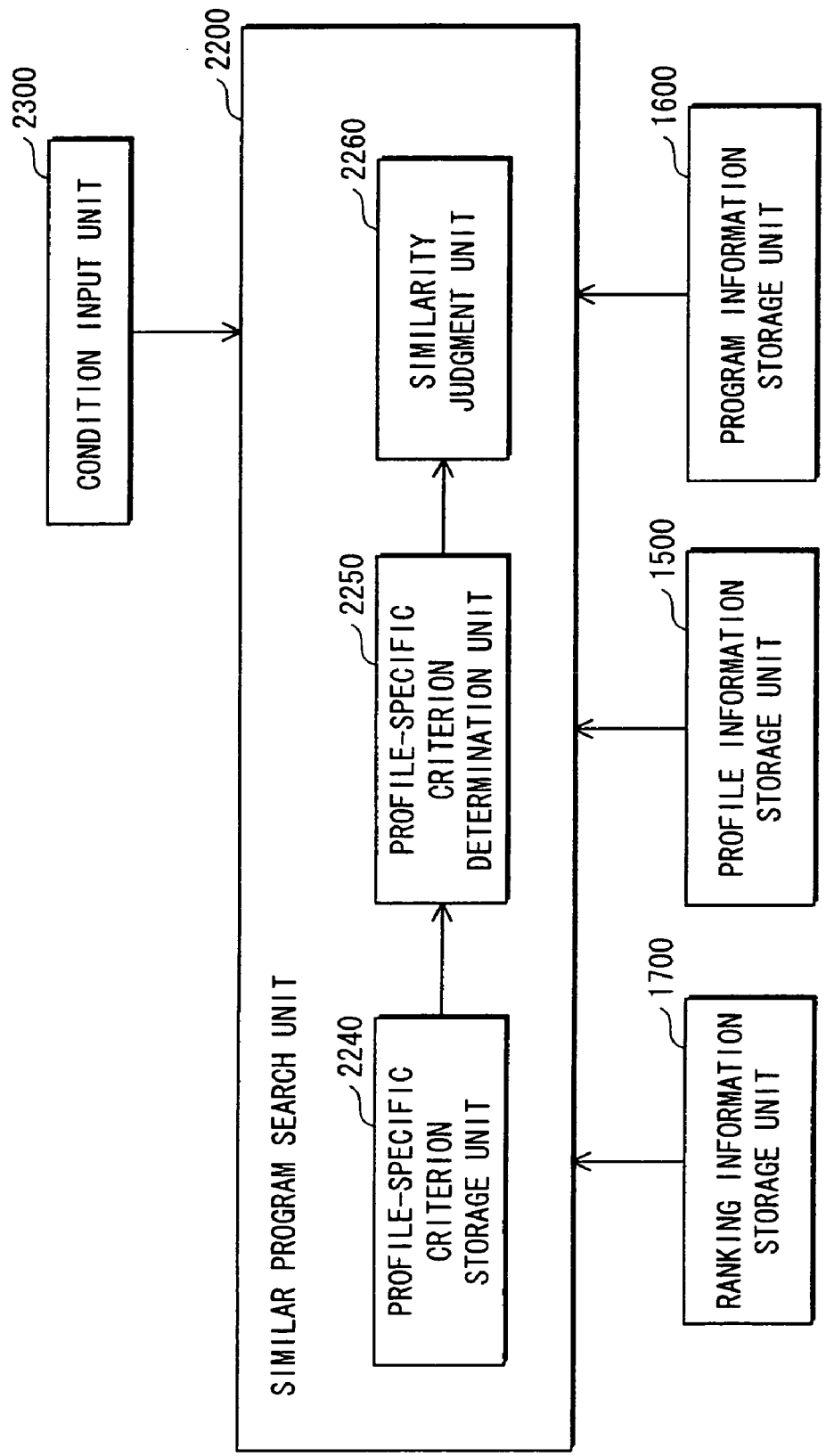
FIG. 4 is a functional block diagram showing a construction of a similar program search unit 2200 in the first embodiment.

FIG. 4 is a functional block diagram showing a construction of the similar program search unit 2200.

The similar program search unit 2200 includes a profile-specific criterion storage unit 2240, a profile-specific criterion determination unit 2250, and a similarity judgment unit 2260.

The profile-specific criterion storage unit 2240 stores a plurality of algorithms for performing similarity judgment based on information about the profile of the viewer. Various data necessary for the similarity judgment, such as a function for actually performing the similarity judgment and a weighting table, is stored in the profile-specific criterion storage unit 2240.

The profile-specific criterion determination unit 2250 has a function of determining an algorithm for similarity judgment, among the plurality of algorithms stored in the profile-specific criterion storage unit 2240. The profile-specific criterion determination unit 2250 determines the algorithm based on a condition and the like set by the viewer through a condition setting menu 2310 (see FIG. 5). Part of a condition related to the viewer is passed from the condition input unit 2300 and stored in the profile-specific criterion storage unit 2240.

The similarity judgment unit 2260 has a function of judging whether a program shown by program information stored in the program information storage unit 1600 is similar to the program designated by the viewer, using the algorithm determined by the profile-specific criterion determination unit 2250.

The similar program search unit 2200 has functions of controlling these functional units and reading necessary data from the program information storage unit 1600.

For instance, the similarity judgment based on the program information 9100 is conducted as follows. A keyword is extracted from the program information 9100 of each program, and processes such as detection of a common keyword and numerical conversion of a keyword are performed to judge the similarity between programs.

The condition input unit 2300 has a function of receiving the viewer-related condition from the viewer.

For example, the condition is set through designation on a menu.

Figure 5:
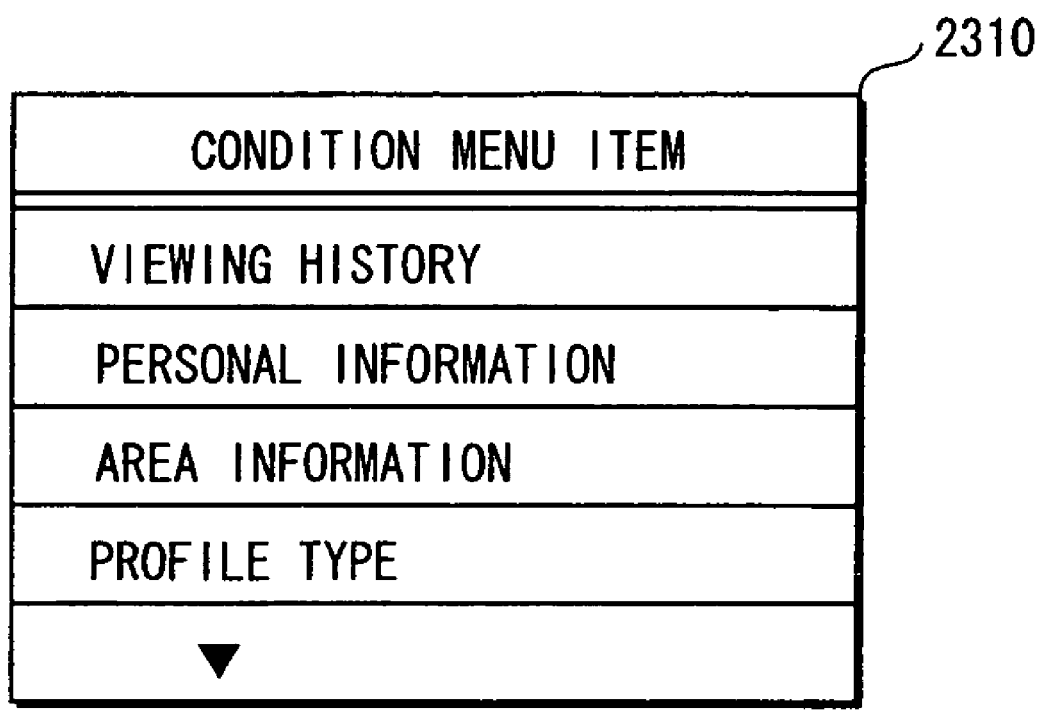
FIG. 5 shows an example of a condition setting menu.

FIG. 5 shows an example of a condition setting menu. Items such as "viewing history" and "personal information" can be selected in this condition setting menu 2310. Selecting any of these items allows the viewer to make detailed condition settings with regard to the item according to need. For example, by selecting "personal information", the viewer can input a usable language or a present location.

The item selected here is treated as important when selecting the similar programs. For instance, if the viewer selects "viewing history", a program containing a keyword that characterizes a most frequently viewed program is displayed first.

The number of items selected here is not limited to one, as the viewer may select a plurality of items. If the viewer makes no selection, the similar programs are selected based on the profile information of the viewer.

The designated condition is passed to the similar program search unit 2200. Once designated, that condition is valid until the viewer performs the next designation.

The user interface unit 2400 and the recording/playback unit 2500 have same functions as general recording/playback devices. In detail, the user interface unit 2400 has a function of receiving an input from a general input medium such as a remote control, and the recording/playback unit 2500 has a function of playing/recording a received program.

The transmission/reception unit 1900 has a function of transferring data with an external device (not illustrated). The external device mentioned here is a broadcast station and a service provision device which is a so-called server. The transmission/reception unit 1900 receives the program information 9100 from the broadcast station, and transmits/receives the ranking information and the like to/from the service provision device. The service provision device will be explained later.

<Data>

The following explains main data used in the program selection support device, with reference to FIGS. 6 to 12.

FIG. 6 shows a structure and a specific example of the program information. In the drawing, an upper table is followed by a lower table, that is, the two tables constitute one table.

There are various types of broadcast program information such as a broadcast program guide transmitted from a television station, a broadcast program guide transmitted from a cable television station, and program information distributed via storage media such as a floppy disk. In this embodiment, the program information 9100 is a list of programs scheduled to be broadcast, which is transmitted from the broadcast station by text broadcasting or the like.

This information is stored in the program information storage unit 1600 in the recording/playback device 2000.

The program information 9100 is made up of a program ID 9101, a broadcast date 9102, a broadcast start time 9103, a broadcast end time 9104, a channel 9105, a broadcast station 2601, a genre 9106, a language 2602, a title 9107, and program contents 9108.

The program ID 9101 is a number for identifying a program to be broadcast. In principle, a same number is assigned to programs having a same title. Even when programs have a same title, however, different numbers are assigned if the contents differ each time as in the case of news. Meanwhile, a rerun of a program is given a same number as the program.

The broadcast date 9102 shows a date on which the program is broadcast. The broadcast start time 9103 and the broadcast end time 9104 respectively show a time at which the broadcasting of the program starts and a time at which the broadcasting of the program ends.

The channel 9105 shows a broadcast channel of the program in an area where the recording/playback device 2000 receives broadcasts.

The broadcast station 2601 shows a television station that broadcasts the program. Here, the broadcast station 2601 shows a television station on a nationwide basis. This being so, the program information 9100 may show programs which are broadcast at a same time on a same channel, because there are cases where broadcast stations differ between areas and so different broadcasts are receivable according to area.

As one example, a program having the program ID "000111" and a program having the program ID "000112" correspond to different broadcast stations "Tokyo TV" and "Osaka TV" and so are broadcast in different areas. Therefore, these programs are listed in the program information 9100 even though they have the same broadcast date 9102 "2004/03/03", the same broadcast start time 9103 "19:00", and the same channel 9105 "008".

The genre 9106 shows a genre of the program.

The language 2602 shows a language used in the program. If the program has sub sound, two languages corresponding to main sound and sub sound are shown by the language 2602.

As one example, the program having the program ID 9101 "000112" has the language 2602 "Japanese/English", indicating that the program is broadcast in both Japanese and English.

The title 9107 shows a title of the program. This title is displayed on the similar program list screen.

The program contents 9108 show the contents of the program, such as a synopsis, a character, and a cast.

As one example, the program having the program ID 9101 "000112" is broadcast on channel 008 from 19:00 to 22:00 of Mar. 3, 2004, has a title "Professional Baseball", and is about "Second League Game: Yankees vs Devils".

The broadcast date 9102 to the channel 9105 are information needed mainly when recording the program, and the broadcast station 2601, the genre 9106, the language 2602, and the program contents 9108 are information referenced when performing the similarity judgment based on the viewer-related condition.

FIG. 7 shows a structure and a specific example of the segment information.

The segment information is provided for each program which has been broadcast.

This information is stored in the program information storage unit 1600 in the recording/playback device 2000.

The segment information 9200 is made up of a program ID 9101, a segment number 9201, a segment start time 9202, and a segment comment 9203.

The program ID 9101 is the same as the program ID in the program information 9100.

The segment number 9201 is a number for identifying a segment in the program shown by the program ID 9101. Each segment of the program has a different segment number.

The segment start time 9202 is a time at which the segment starts, expressed relative to a start time of the program.

The segment comment 9203 shows a keyword about the segment. For instance, a keyword in captions which is retrieved when dividing the program into segments is shown by the segment comment 9203.

As one example, a segment having the segment number "002" in a program having the programID "005124" starts "00:30:00", i.e. 30 minutes, after the start of the program and relates to "cat".

FIG. 8 shows a structure and a specific example of the profile information.

The profile information 1510 is made up of an item 1511 and contents 1512.

This information is stored in the profile information storage unit 1500 in the recording/playback device 2000.

The profile information 1510 shows an attribute of the viewer, and includes not only personal information such as sex but also information about a viewing tendency, i.e. what kinds of programs the viewer watches frequently.

As one example, a viewer identified by a userID "U00010" is a 31-year-old male, and has a viewing tendency in which he most frequently records programs of the "society/report" genre and most frequently transmits evaluations of programs of the "sports" genre.

Also, a most frequent keyword in program information of programs watched by the viewer is "stock price", and a second most frequent keyword is "distribution". These keywords are extracted from the program information by the present system referencing a terminology dictionary and performing analysis by morphological analysis and the like.

The viewing tendency can also be shown by various elements such as a frequently viewed television station, time, and cast.

Also, the usable language is "Japanese/English", and the profile type is "P05".

The profile type is one of a plurality of profile types to which the profile of the viewer is classified according to characteristics. Each viewer is classified to one of the plurality of profile types corresponding to his/her profile. A profile includes personal information such as sex and age, a viewing history, and the like.

Note that the evaluation transmission will be described later.

FIG. 9 shows a structure and a specific example of program designation information.

Program designation information 2210 indicates a program and a segment in the program designated by the viewer. The program selection support device searches for programs that are similar to the program shown by this information.

This information is generated by the similar program search unit 2200 when the viewer instructs to display the similar program list screen 3100, and held in a work storage area (not illustrated) in the similar program search unit.

The program designation information 2210 is made up of a program ID 9101, a designated time 2211, and a segment number 9201.

The program ID 9101 is a program ID of a program designated by the viewer, that is, a program which is being played back when the viewer instructs to display the similar program list screen 3100. The designated time 2211 shows a time at which the viewer issues the display instruction, that is, a time from the beginning of the program being played back.

The segment number 9201 can be determined from the designated time 2211, with reference to the segment information 9200 (see FIG. 7) of the program shown by the program ID 9101.

As one example, the program ID of the program which is being played back when the viewer instructs to display the similar program list screen 3100 is "005124", the designated time at which the viewer issues the display instruction is "01:20:00", and the segment number of the segment which is being played back when the designated time "01:20:00", i.e. one hour and twenty minutes, has elapsed from the beginning of the program is "003".

FIG. 1 shows a structure and a specific example of a search result program list.

A search result program list 2220 is a list of programs which are judged as being similar as a result of the similarity judgment based on the program information 9100. This search result program list 2220 is further narrowed down based on the viewer-related information, to obtain the similar program list 3110 (see FIG. 2).

The search result program list 2220 is generated by the similar program search unit 2200 and held in the work storage area (not illustrated) in the similar program search unit 2200.

The search result program list 2220 is made up of a program ID 9101, a title 9107, a segment number 9201, a broadcast station 2601, a genre 9106, and a language 2602.

The program ID 9101 is a program ID of a program which is judged as being similar. The title 9107 shows a title of the program.

The segment number 9201 shows a segment which is judged as being similar. If the program has two or more segments which are judged as being similar, the segment number 9201 shows a top one of the segments.

The broadcast station 2601, the genre 9106, and the language 2602 show a broadcast station that broadcasts the program, a genre of the program, and a language used in the program (see FIG. 6).

FIG. 11 shows a structure and a specific example of recorded program information.

The recorded program information 1610 is information about a program which has been recorded by the recording/playback unit 2500 and a program which is scheduled to be recorded.

The recorded program information 1610 is referenced by the similar program display unit 2100 when judging whether a program listed in the similar program list 3110 has already been recorded or not.

The recorded program information 1610 is stored in the program information storage unit 1600 in the recording/playback device 2000.

FIG. 12 shows a structure and a specific example of ranking information.

The ranking information 1710 organizes programs and segments in the programs in descending order of fun button press count, for each profile type.

Here, when a fun button press count is larger, a program is regarded as being more highly evaluated.

The ranking information 1710 is made up of a profile type 5151, a program ID 9101, a program press count 1711, a segment number 9201, a segment press count 1712, and a segment start time 1713.

The program press count 711 is a total number of presses of the fun button during the program. The segment press count 1712 is a total number of presses of the fun button during the segment.

The segment start time 1713 is an actual time at which the broadcasting of the segment starts, and is calculated by adding the broadcast start time of the program and the segment start time of the segment.

As one example, the program press count 1711 corresponding to the program ID 9101 "000111" is the highest "15000" in the profile type 5151 "P01". This indicates that the viewers of the profile type "P01" find the program shown by the program ID "00111" most interesting. Likewise, the segment press count 1712 corresponding to the segment number 9201 "030" is the highest "4000" in the profile type 5151 "P01". This indicates that the viewers of the profile type "P01" find the segment shown by the segment number 9201 "030" most interesting. The segment start time 1713 of this segment is "19:55:00", that is, the segment starts at 19:55.

The ranking information 1710 is stored in the ranking information storage unit 1700 in the recording/playback device 2000.

<Operations>

Operations of the program selection support device having the above construction are described below, with reference to FIGS. 13 to 15.

Figure 13:
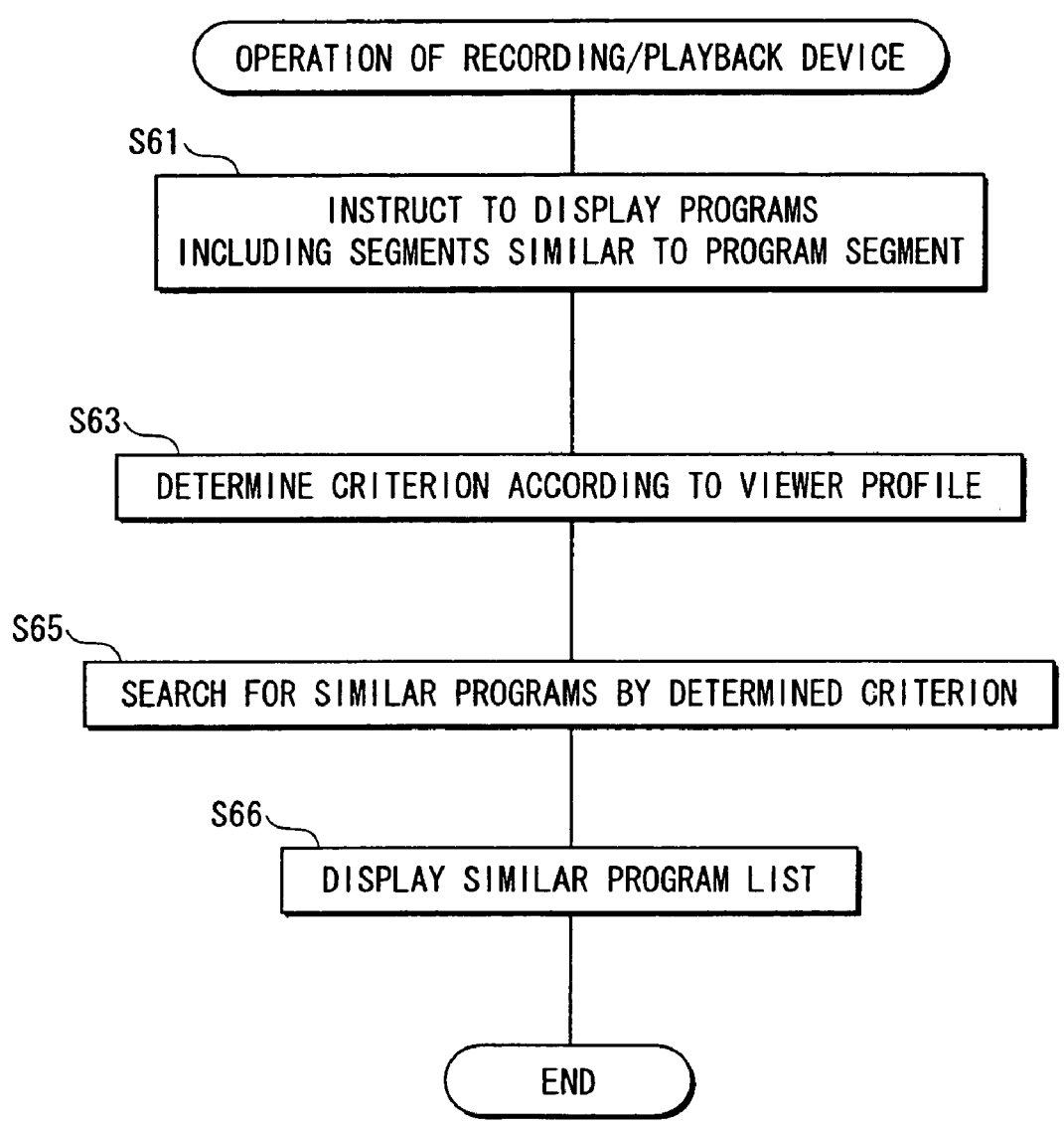
FIG. 13 is a flowchart showing an operation up to displaying the similar program list screen in the first embodiment.

FIG. 13 shows an operation of displaying the similar program list 3110 on the screen when the viewer instructs to display the similar program list screen 3100 while viewing a program.

The instruction to display the similar program list screen 3100 is made by the viewer pressing a similar program display button on the remote control. In this embodiment, this display instruction is made only when a program is being played back.

Suppose a program is being played back in the recording/playback device 2000. The playback mentioned in this embodiment includes not only an operation of playing a recorded program but also an operation of receiving a program which is being broadcast and playing the received program.

The viewer watches the program which is being played, and presses the similar program display button on the remote control when he/she wants to know more about the broadcast contents (step S61), in order to have programs whose contents relate to the broadcast contents displayed.

If the program which is being played when the similar program display button is pressed is a broadcast program, the program continues to be broadcast through reception of video. If the program which is being played when the similar program display button is pressed is a recorded program, the playback is stopped at this point. Here, the playback may not be stopped according to an instruction from the viewer.

Upon detecting the press of the similar program display button via the user interface unit 2400, the recording/playback device 2000 requests the similar program search unit 2200 to display the similar program list. Upon this request, the similar program search unit 2200 is notified of a program ID of the program being played and a time elapsed from the beginning of the program. Here, the recording/playback device 2000 stores the program ID of the program being played and counts a playback duration from the beginning of the program.

Having received the request to display the similar program list, the similar program search unit 2200 specifies a segment number from the program ID of the program and the time elapsed from the beginning of the program, and generates the program designation information 2210 (see FIG. 9).

Here, the segment number is specified based on the segment information 9200 (see FIG. 7). As one example, when the program ID 9101 of the program is "005124" and the designated time 2211 from the beginning of the program is "01:20:00", the segment corresponding to the elapsed time of one hour and twenty minutes from the beginning of the program is the segment having the segment number "003", with reference to the segment information 9200.

After generating the program designation information 2210, the similar program search unit 2200 requests the profile-specific criterion determination unit 2250 to determine a similarity criterion used for similarity judgment.

Upon receiving the request, the profile-specific criterion determination unit 2250 determines an optimal one of the algorithms stored in the profile-specific criterion storage unit 2240 as a similarity criterion, based on the profile information 1510 of the viewer (step S63). Examples of the similarity criterion will be explained later with reference to FIGS. 14 and 15.

Once the similarity criterion has been determined, the similar program search unit 2200 reads the program information 9100 from the program information storage unit 1600, and requests the similarity judgment unit 2260 to search the read program information 9100 for programs similar to the program designated by the program designation information 2210.

The determined similarity criterion is notified from the profile-specific criterion determination unit 2250 to the similarity judgment unit 2260 and used when the similarity judgment unit 2260 judges similarity between programs.

Upon receiving the request, the similarity judgment unit 2260 searches for similar programs using the notified similarity criterion. The similarity judgment unit 2260 searches for programs including segments which are similar to the segment shown by the segment number 9201 in the program designation information 2210, and generates the similar program list 3110 (step S65).

The similar program search unit 2200 passes the similar program list 3110 generated by the similarity judgment unit 2260 to the similar program display unit 2100, and requests the similar program display unit 2100 to display the similar program list 3110.

When making the display request, the similar program search unit 2200 judges, for each similar program, whether the similar program has already been recorded by referring to the recorded program information 1610 (see FIG. 11). If the similar program has already been recorded, the similar program search unit 2200 requests the similar program display unit 2100 to display that the similar program has already been recorded.

Upon receiving the similar program list 3110 and the display request, the similar program display unit 2100 opens the similar program list screen 3100 and displays the similar program list 3110 (step S66).

Examples of the similarity criterion based on the profile information 1510 are explained next, with reference to FIGS. 14 and 15.

If an item is selected in the condition menu 2310 (step S100: YES), two levels of similarity criterion, i.e., searching for similar programs based on the program information 9100 by a conventional method and further narrowing down the similar programs based on the viewer-related condition, are used. If no item is selected in the condition menu 2310 (step S100: NO), a similarity criterion in consideration of a viewing history of the viewer is used (step S110).

Similarity Criterion Examples

Figure 14:
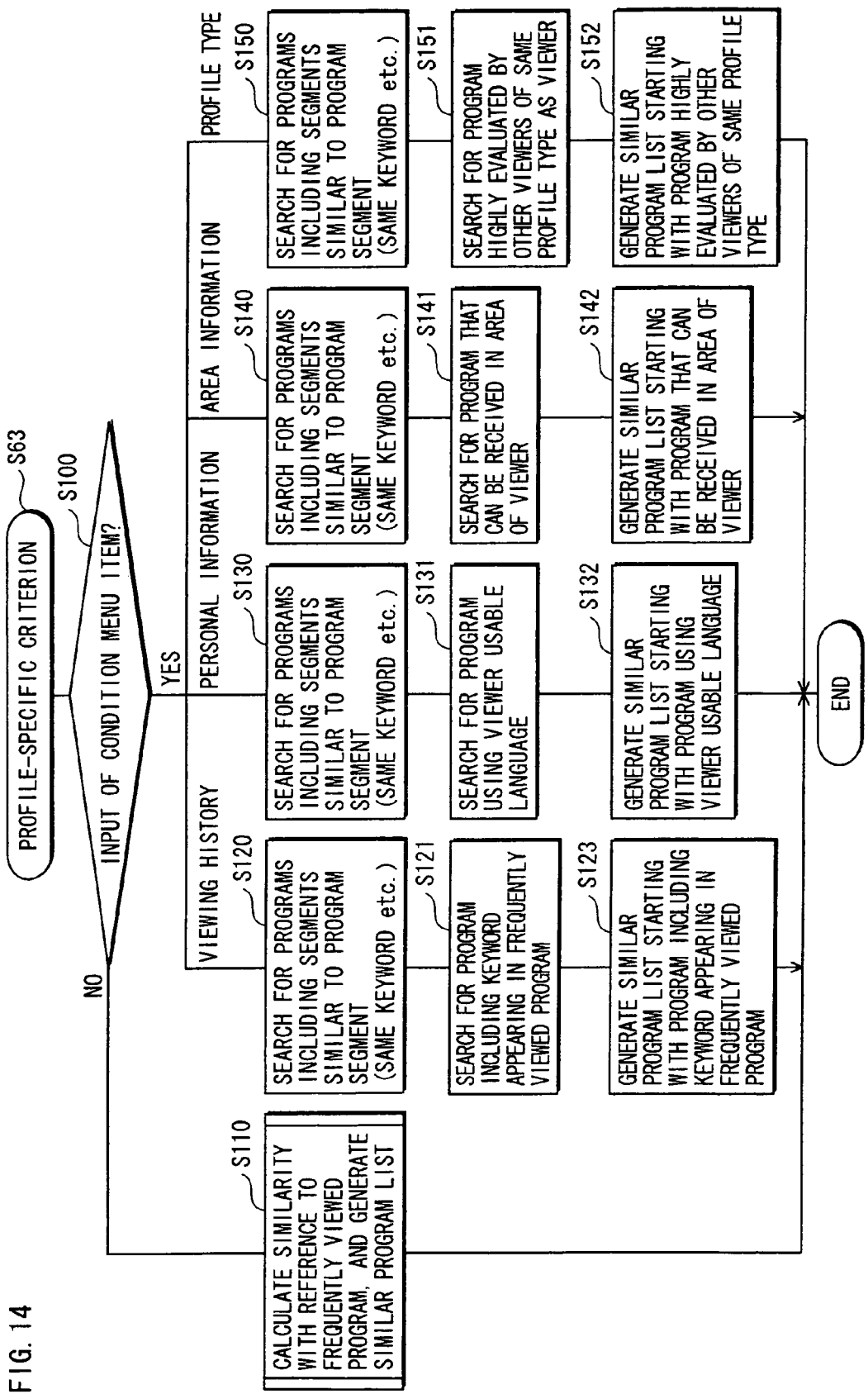
FIG. 14 is a flowchart showing an example operation for profile-specific criteria.
Figure 15:
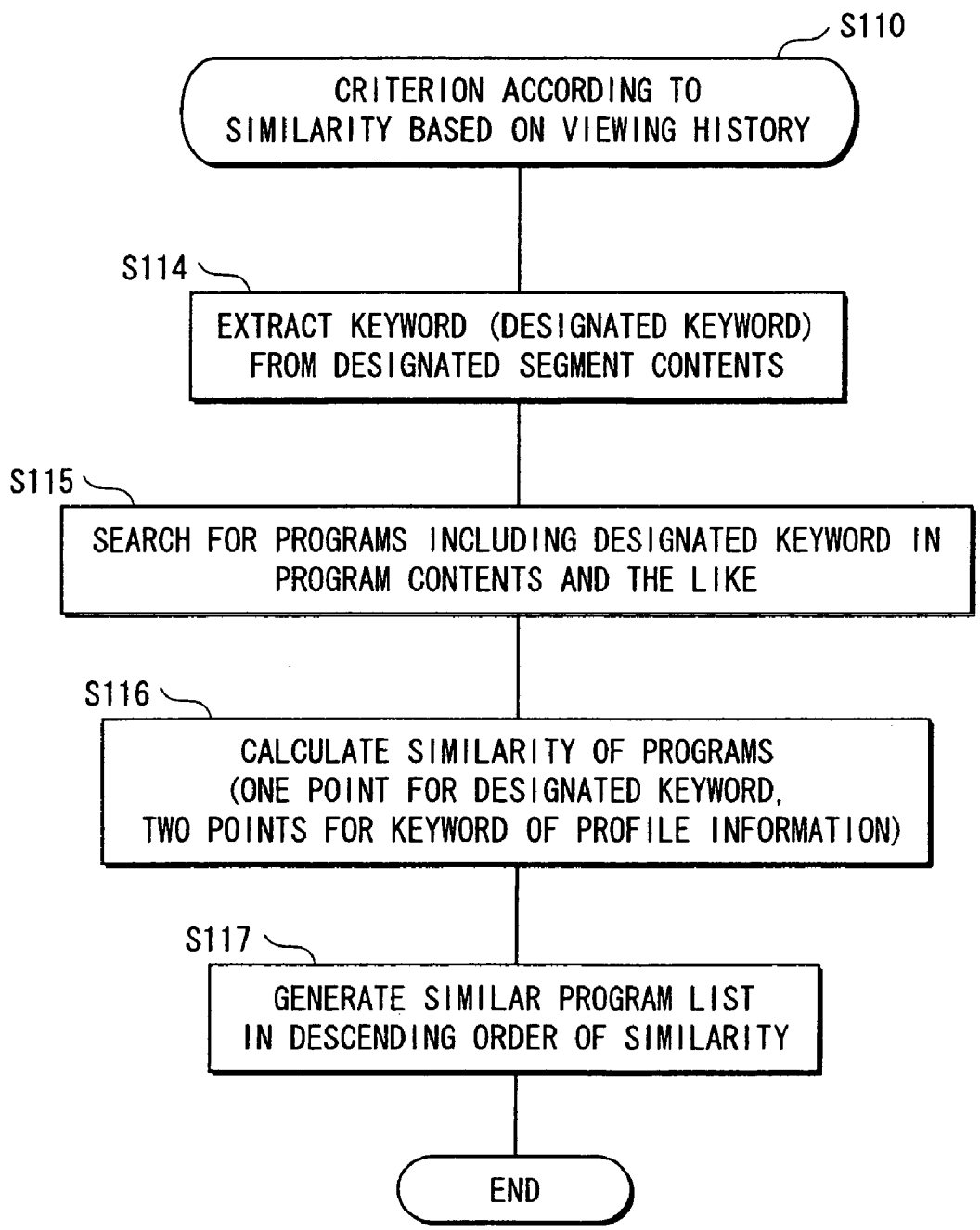
FIG. 15 is a flowchart showing an example operation for a criterion in consideration of a viewing history.

The criterion in the case where an item is selected in the condition menu 2310 is explained first, with reference to FIG. 14.

The criterion is changed depending on the item selected in the condition menu 2310 stored in the profile-specific criterion storage unit 2240 (step S100).

In this embodiment, firstly a search is performed for programs including segments which are similar to the segment shown by the program designation information 2210, to generate the search result program list 2220 (steps S120, S130, S140, S150).

The similarity judgment in this case is the same as conventional similarity judgment such as selecting programs having a common keyword as similar programs.

As one example, when the segment comment 9203 corresponding to the segment number 9201 in the program designation information 2210 is "whale" (see FIG. 7), a search is performed for segments similar to this segment using "whale" as a keyword. The search result program list 2220 is generated from the program information 9100 (see FIG. 6), using program IDs of programs including similar segments found as a result of this search.

Next, a further search is performed on the search result program list 2220 using the viewer-related condition, i.e. the item selected in the condition menu in this embodiment (step S121, etc.) to generate the similar program list 3110 (step S123, etc.). Types of the viewer-related condition and methods for performing the further search will be explained later.

As a result of such a two-level program search, programs more desired by the viewer can be found. That is, by increasing display positions of the programs found as a result of the search refinement based on the viewer-related condition, programs which the viewer wants to watch can be found easily.

Here, only the programs obtained as a result of the search refinement may be displayed.

The following describes an operation of changing a display order of the programs of the search result program list 2220 based on the viewer-related condition to generate the similar program list 3110.

There are various types of viewer-related condition. In this embodiment, a condition relating to the viewing history of the viewer, a condition relating to the personal information of the viewer, a condition relating to the location of the viewer, and a condition relating to the profile type of the viewer are used as examples (see FIG. 5).

The condition input unit 2300 notifies the similar program search unit 2200 of the condition selected in the condition setting menu 2310. The similar program search unit 2200 stores this condition.

<Condition relating to the Viewing History of the Viewer>

Various conditions can be set from the viewing history of the viewer, such as a viewing tendency. An example of generating the similar program list 3110 using a keyword appearing in program information of a program frequently viewed by the viewer is described below.

Various types of keywords can appear in program information of a program, such as a keyword used in the explanation of the program contents and a keyword set by a producer of the program. Accordingly, various condition settings can be made when generating the similar program list 3110.

In detail, a higher degree of similarity may be given to a program whose program contents explanation contains a larger number of a common keyword. Also, a keyword set by the program producer, e.g. a keyword about a next episode, may be assigned a higher weight than other keywords. This keyword set by the program producer can be received having been added to an EPG or provided from a service company via an internet or the like.

An example of generating the similar program list 3110 is explained below, on an assumption that a keyword frequently appearing in viewed programs reflects the interest of the viewer.

As one example, the keyword 1 corresponding to the viewer identified by the user ID "U000110" is "stock price", indicating that the most frequent keyword in program information of viewed programs is "stock price". Also, the keyword 2 corresponding to this viewer is "distribution", indicating that the second most frequent keyword in the program information of the viewed programs is "distribution" (see FIG. 8). Accordingly, a search is performed for similar programs according to the conventional method of similarity judgment (step S120), and then a further search is performed on these similar programs for programs whose program information contains the frequent keywords (step S121). The similar programs are reordered in descending order of keyword appearance frequency, to thereby generate the similar program list 3110 (step S123).

Here, the similar program list 3110 may be generated using a condition other than a keyword, such as a program genre.

In this case, the similar program list 3110 is generated on an assumption that the viewer watches similar programs of a same genre as a most frequently viewed program.

In detail, the search result program list 2220 is searched for programs of a genre frequently viewed by the viewer, and reordered so that the programs of the frequently viewed genre are displayed first.

As one example, the viewing genre 1 corresponding to the viewer having the user ID "000110" is "society/report", indicating that the genre most frequently viewed by the viewer is "society/report". Also, the viewing genre 2 corresponding to this viewer is "documentary", indicating that the genre second most frequently viewed by the viewer is "documentary" (see FIG. 8). This being so, the search result program list 2220 is reordered in descending order of genre viewing frequencies, to thereby generate the similar program list 3110. In such a similar program list 3110, a program whose genre is "society/report" is placed first, and a program whose genre is "documentary" is placed second.

As a result of this reordering, the programs of the genres frequently viewed by the viewer are placed first among the similar programs. This helps the viewer find a similar program which he/she wants to watch.

<Condition relating to the Personal Information of the Viewer>

Various conditions can be set from the personal information of the viewer. An example of generating the similar program list 3110 based on a condition relating to a language usable by the viewer is explained below.

The similar program list 3110 is generated from the search result program list 2220, on an assumption that the viewer is unlikely to watch programs using languages other than the usable language.

The search result program list 2220 is searched for programs that use the viewer usable language (step S131), and reordered so that the programs using the viewer usable language are displayed first (step S132).

As one example, the language 2602 corresponding to the viewer having the user ID U000110" is "Japanese/English", indicating that the viewer can use Japanese and English (see FIG. 7). Accordingly, the search result program list 2220 is reordered so that programs which use "Japanese/English", "Japanese", or "English" are placed first, to there by generate the similar program list 3110.

<Condition relating to the Location of the Viewer>

Various conditions can be set based on the location of the viewer. Here, programs that can be received in an area where the viewer is present, i.e., an area where the viewer view programs, are placed first in the similar program list 3110. This is because if the viewer cannot receive a program, he/she cannot view the program immediately.

The search result program list 2220 is searched for programs that can be received by the viewer (step S141), and reordered so that the programs receivable by the viewer are displayed first (step S142).

The area where the viewer is present may be set in the condition menu beforehand. Alternatively, a GPS (Global Positioning System) may be equipped in the recording/playback device 2000 with a correspondence table between broadcast stations 2601 and areas that can receive broadcast programs being stored therein, so that receivable broadcast stations can be specified based on positional information obtained by the GPS. Also, the viewer may set the area when performing channel settings and the like.

Regarding sports broadcasts such as baseball programs, for example, if any baseball club has a home ground in the area of the viewer, a baseball game broadcast of that baseball club may be placed first in the similar program list, on an assumption that the viewer wants to watch a game of his/her home team.

In such a case, the recording/playback device 2000 stores correspondence information between areas and baseball clubs and judges a baseball club based on positional information obtained by the GPS.

<Condition relating to the Profile Type of the Viewer>

Programs highly evaluated by other viewers of the same profile type as the viewer are placed first in the similar program list 3110, on an assumption that the viewer wants to watch the programs highly evaluated by other viewers of the same profile type.

The search result program list 2220 and the ranking information 1710 (see FIG. 12) are compared with each other. If a same program ID and segment number as the search result program list 2220 are found in the profile type 5151 of the viewer in the ranking information 1710, a program shown by that program ID is placed first in the similar program list 3110.

The search result program list 2220 is searched for programs highly evaluated by other viewers of the same profile type as the viewer (step S151), and reordered so that the programs highly evaluated by other viewers of the same profile type are displayed first (step S152).

A method of generating the ranking information 1710 will be explained later, with reference to FIGS. 17 to 25.

<Criterion in consideration of Viewing History>

A criterion in consideration of the viewing history of the viewer is explained below.

This criterion is used in a case where no item is selected in the condition menu 2310, and is explained below with reference to FIG. 15.

First, a keyword is extracted from the segment comment 9203 of the segment shown by the segment number 9201 in the program designation information 2210 (step S114). The key word extracted here is assumed to characterize the segment. This keyword is hereafter referred to as "designated keyword".

As one example, in the segment comment 9203 corresponding to the program ID 9101 "005124" and the segment number 9201 "003", the designated keyword is "whale".

Next, a search is performed for programs including the designated keyword in the program contents 9108 and the like (step S115).

A degree of similarity of each of the programs found as a result of the search is calculated. Here, a point is given to each keyword and a degree of similarity is determined by a total point.

In detail, the contents 1512 of the item 1511 "keyword 1" in the profile information 1510 of the viewer are used as a history keyword. As one example, the item 1511 "keyword 1" of the profile information 1510 of the viewer is "stock price", and so the history keyword is "stock price".

Each of the number of designated keywords and the number of history keywords is not limited to one, and may be plural.

A specific method of similarity calculation is as follows. One point is given to one appearance of the designated keyword in the program contents 9108 and the like, and two points are given to one appearance of the history keyword in the program contents 9108 and the like. Having done so, a total point is calculated to determine the degree of similarity (step S116).

A program with a higher total point is judged as having a higher degree of similarity. The similar program list 3110 is generated in descending order of similarity (step S117).

By calculating the similarity in the above way, programs more desired by the viewer can be retrieved. Given that a keyword appearing in programs frequently viewed by the viewer is likely to reflect the interest of the viewer, the similarity is calculated with such a keyword being assigned a higher weight than other keywords. As a result, programs which the viewer want to watch can easily be found.

Here, instead of calculating the similarity by assigning different points to the designated keyword and the history keyword, the history keyword may be used to rank programs which have ended up having a same total point as a result of using only the designated keyword. For example, a program with a larger number of appearances of the history keyword may be placed higher in the similar program list 3110.

Furthermore, the similar program list 3110 may be generated by calculating the similarity between programs with larger weights being assigned to genres frequently viewed by the viewer.

As one example, the most frequently viewed genre of the viewer having the user ID "U000110" is "society/report", and the second most frequently viewed genre of the viewer is "documentary". This being the case, the similarity between programs is calculated by assigning a highest weight to the genre "society/report" and a second highest weight to the genre "documentary".

This embodiment describes the case where, if no item is selected in the condition menu 2310 (step S100: NO), the similar program list is generated using the similarity criterion inconsideration of the viewing history of the viewer. However, a similarity criterion in consideration of an item in the condition menu may instead be used. For instance, a similarity criterion in consideration of a previously selected item in the condition menu may be put to use.

Also, the similar program list may be generated in a form of reflecting all items of the condition menu. In this case, how far each item will be reflected may be varied depending on which programs are selected by the viewer. In more detail, initially the similar program list randomly lists programs including the keyword appearing in the frequently viewed program and programs using the viewer usable language (see steps S121, S131, S141, S151). Subsequently, if the viewer selects programs using the viewer usable language more often, the similar program list is updated to display programs using the viewer usable language first.

Second Embodiment

<Overview>

A program selection support device according to a second embodiment does not search for similar programs through comparison in program contents and the like, but classifies programs into categories and searches for similar programs according to an algorithm corresponding to each category.

In other words, though the similarity judgment in the second embodiment still uses the program information 9100, a feature of a category to which a program belongs is reflected on the similarity judgment.

The categories into which the programs are classified may be genres shown in the program information. Also, the programs may be classified in other ways.

<Construction>

The program selection support device according to this embodiment is described below, with reference to FIGS. 16 and 17.

Figure 16:
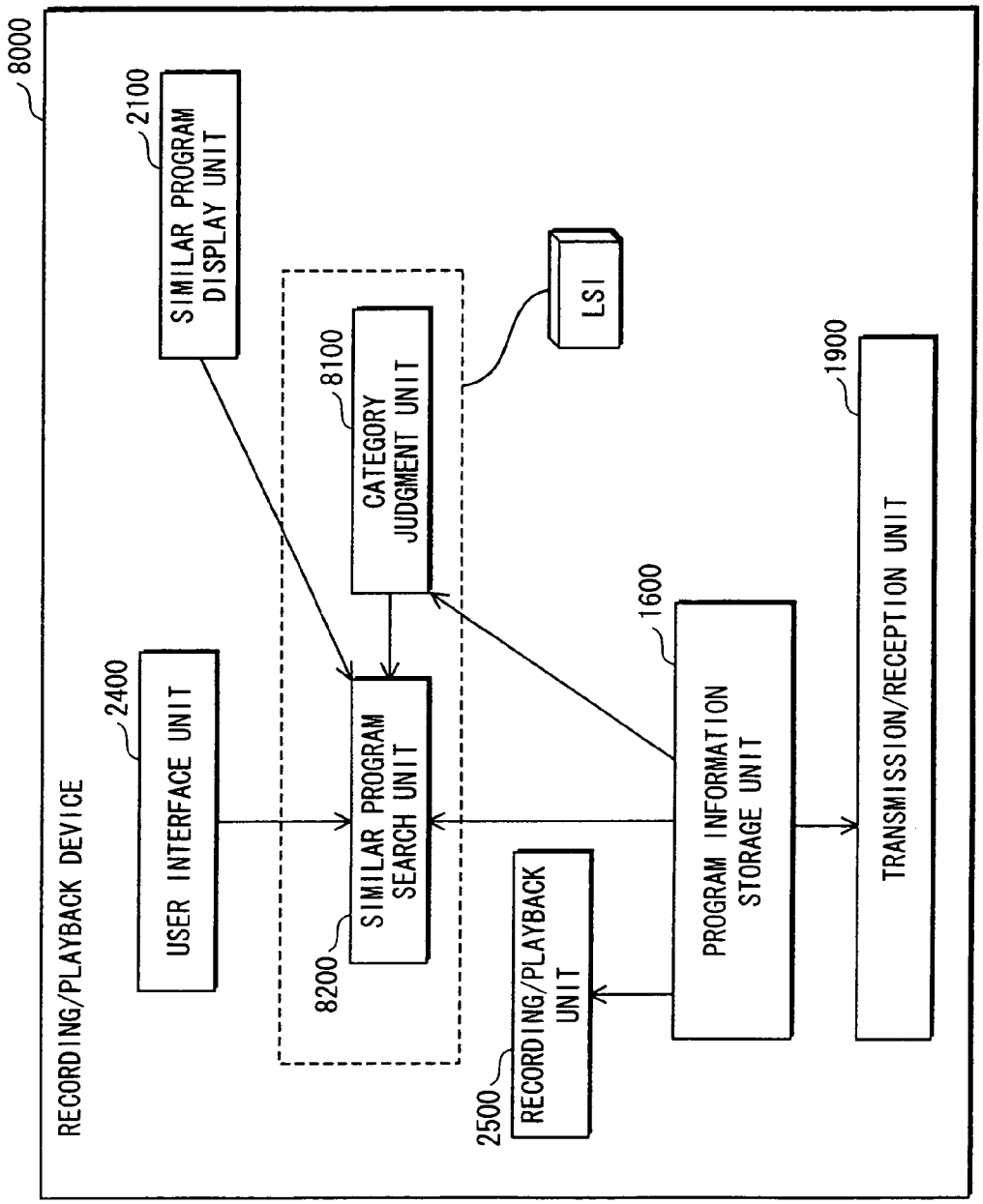
FIG. 16 is a functional block diagram showing a construction of a recording/playback device in a second embodiment.

FIG. 16 is a functional block diagram showing a construction of a recording/playback device in the second embodiment.

A recording/playback device 8000 includes a similar program search unit 8200, a category judgment unit 8100, the similar program display unit 2100, the user interface unit 2400, the recording/playback unit 2500, the program information storage unit 1600, and the transmission/reception unit 1900.

The functions of each unit other than the similar program search unit 8200 and the category judgment unit 8100 are the same as those in the first embodiment (see FIG. 3).

The category judgment unit 8100 has a function of classifying programs based on the program information 9100 stored in the program information storage unit 1600, and judging a category to which a program belongs.

Information based on which the category judgment unit 8100 makes the judgment includes a set of keywords extracted from text information about the program contents and persons using a terminology dictionary, a morphological analysis, or the like, and information not directly related to the program contents, such as a broadcast time. Based on such information, the category judgment unit 8100 judges a category of a program by using a category dictionary, a vector space model, and the like. Here, genres shown in an EPG may be used as categories.

Suppose a program designated by pressing a remote control button during playback has a broadcast start time "21:00", a broadcast end time "21:55", a genre "drama", and a title "pure love story". If a plurality of programs with the same title "pure love story" as this program have the same broadcast time and day of the week, this program is judged as belonging to a category "drama series". Here, in a case where categories are transmitted in a state of being contained in the program information and the like, the category judgment unit 8100 may use the transmitted categories.

A category to which a segment belongs is judged based on a segment comment and the like, in the same manner as above.

The similar program search unit 8200 has a function of searching the program information 9100 stored in the program information storage unit 1600 for programs similar to the viewer designated program, using an algorithm corresponding to the category judged by the category judgment unit 8100.

Which is to say, the similar program search unit 8200 judges the similarity between programs based on importance that is specified for each element of program information according to category, and importance that is specified for each feature of program information according to category.

Figure 17:
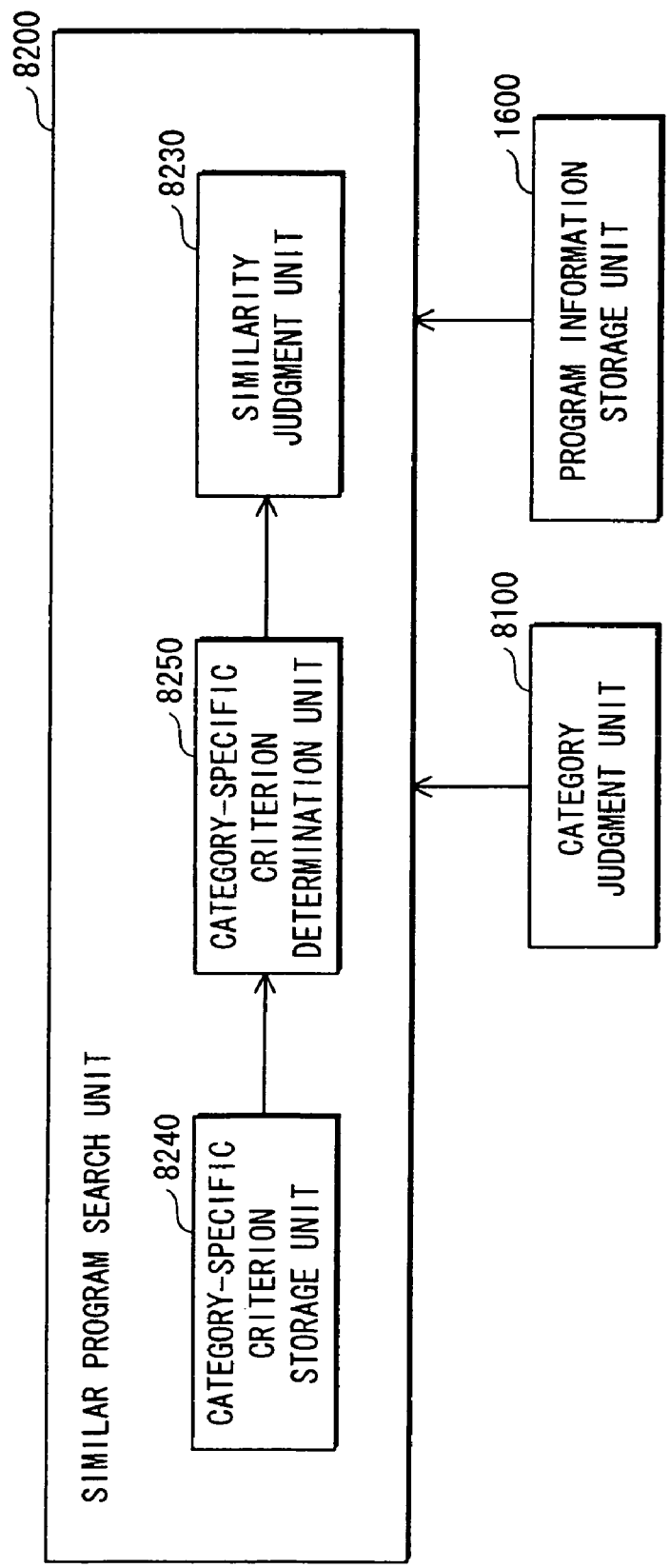
FIG. 17 is a functional block diagram showing a construction of a similar program search unit 8200 in the second embodiment.

FIG. 17 is a functional block diagram showing a construction of the similar program search-unit 8200.

The similar program search unit 8200 includes a category-specific criterion storage unit 8240, a category-specific criterion determination unit 8250, and a similarity judgment unit 8260.

The category-specific criterion storage unit 8240 stores a plurality of algorithms for similarity judgment according to a category of a program. Various data necessary for similarity judgment, such as a function for actually performing similarity judgment and a weighting table, is stored in the category-specific criterion storage unit 8240. That is, the category-specific criterion storage unit 8240 holds, for each category, similarity judgment information regarding which of the elements of the program information, such as a broadcast date or a title, is used as a basis for similarity judgment and which of the elements has higher importance.

The category-specific criterion determination unit 8250 has a function of determining an algorithm for similarity judgment, among the plurality of algorithms stored in the category-specific criterion storage unit 8240.

The similarity judgment unit 8260 has a function of judging whether a program stored in the program information storage unit 1600 is similar to the viewer designated program, using the algorithm determined by the category-specific criterion determination unit 8250.

The similar program search unit 8200 has functions of controlling these functional units and reading necessary data from the program information storage unit 1600.

<Operations>

Operations of the program selection support device in the second embodiment are described below, with reference to FIG. 18.

Figure 18:
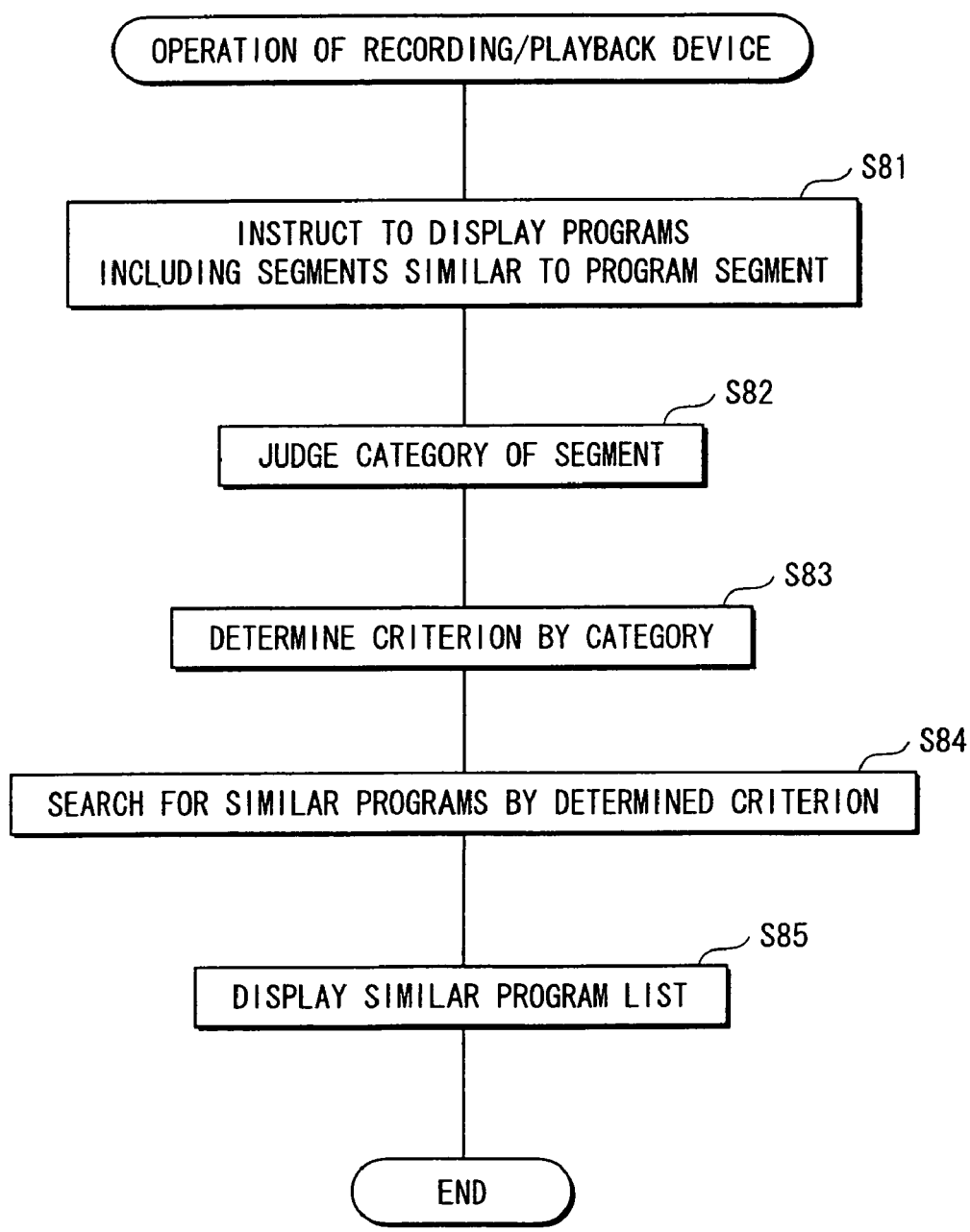
FIG. 18 is a flowchart showing an operation up to displaying a similar program list screen in the second embodiment.

FIG. 18 shows an operation up to displaying the similar program list screen in the second embodiment.

The viewer instructs to display the similar program list screen 3100 by pressing the similar program display button on the remote control (step S81). In this embodiment, this display instruction is performed only when a program is being played back, that is, the viewer designates the program being played back.

Steps from the designation of the program up to the generation of the program designation information 2210 (see FIG. 9) are the same as those in the first embodiment.

Having generated the program designation information 2210, the similar program search unit 8200 passes the program designation information 2210 to the category judgment unit 8100, and requests the category judgment unit 8100 to judge a category.

Upon receiving the request, the category judgment unit 8100 judges the category of a designated segment from the segment information 9200 and the program information 9100, and returns the judged category to the similar program search unit 8200 (step S82). For example, the category judgment unit 8100 notifies the similar program search unit 8200 that the category is "drama series".

The similar program search unit 8200 then passes the category judged by the category judgment unit 8100 to the category-specific criterion determination unit 8250, and requests the category-specific criterion determination unit 8250 to determine a similarity criterion.

Upon receiving the request, the category-specific criterion determination unit 8250 determines an optimal one of the plurality of algorithms stored in the category-specific criterion storage unit 8240 as the similarity criterion (step S83). Examples of the similarity criterion will be explained later with reference to FIG. 19.

Once the similarity criterion has been determined, the similar program search unit 8200 reads the program information 9100 from the program information storage unit 1600 and requests the similarity judgment unit 8260 to search the read program information 9100 for programs similar to the program shown by the program designation information 2210.

Here, the determined similarity criterion is notified from the category-specific criterion determination unit 8250 to the similarity judgment unit 8260 and used when the similarity judgment unit 8260 judges the similarity.

Upon receiving the request, the similarity judgment unit 8260 searches for similar programs using the notified similarity criterion. The similarity judgment unit 8260 searches for programs including segments similar to the segment shown by the segment number 9201 in the program designation information 2210, and generates the similar program list 3110 (step S84).

The similar program search unit 8200 requests the similar program display unit 2100 to display the similar program list 3110. If any of the similar programs has already been recorded, the similar program search unit 8200 also requests the similar program display unit 2100 to display that the similar program has already been recorded.

Upon receiving the display request, the similar program display unit 2100 opens the similar program list screen 3100 and displays the similar program list 3110 (step S85).

An example of the similarity criterion based on the category is described below, with reference to FIG. 19.

In this example, program genres are used as categories, with a criterion for each genre having been determined in advance. However, segment genres may be used instead of program genres.

First, a genre of the program including the segment shown by the program designation information 2210 is extracted (step S71). In detail, the category judged by the category judgment unit 8100, i.e. the genre in this embodiment, is used. This genre is hereafter referred to as "designated genre".

The following explains an example where the designated genre is "drama" (step S72). If the designated genre is other than "drama", such as news or music programs, a criterion that has been specified for such a genre in advance is used instead (step S79). As one example, when the category is "business/documentary", the similarity between programs is judged by placing high importance on a business-related keyword in the program contents. Also, when the category is "news", a news program including a segment which contains a keyword, e.g. "recalled car line", relating to the segment shown by the designation information 2210 is given a highest degree of similarity.

In the case where the designated genre is "drama", an element used for similarity judgment is extracted from the program contents 9108 of the program shown by the program ID 9101 and the segment comment 9203 of the segment shown by the segment number 9201 in the program designation information 2210 (step S73). The extracted element differs depending on the genre.

There are two types of information for similarity judgment, namely, an element in the program information and a feature in the program information. The similarity between programs is judged based on these information.

An element in the program information includes a broadcast date, a broadcast start time, a broadcast end time, a broadcast station, a title, program contents, a genre, a person, and the like.

A feature in the program information includes the contents of each element, such as a broadcast start time "20:00", keywords "company, reconstruction, challenge" included in the program contents, a genre "documentary", and the like.

If the genre is "drama", five elements of "drama", i.e. a title, a broadcast date, a person, a keyword, and a genre, are used with descending importance being assigned in this order. A reason for assigning highest importance to the title is as follows. In the case of drama, there is a high possibility that programs with a same title are a drama series or related drama and so the viewer want to watch these programs as similar programs. For the same reason, high importance is assigned to the broadcast date.

These elements are hereafter referred to as "designated title", "designated broadcast date", "designated person", "designated keyword", and "designated genre".

A search is performed on the program contents 9108 and the like for programs including these elements (step S74). It should be noted here that "designated broadcast date" is not used in this search.

Next, the similarity of the programs found as a result of the search is judged (step S75). Here, an element with higher importance corresponds to higher similarity. In more detail, a program whose title is the same as the designated title is judged as having highest similarity. If there are a plurality of programs of the same title, a program whose broadcast date is after the designated broadcast date is judged as having higher similarity than a program whose broadcast date is before the designated broad cast date, and also a program whose broadcast date is closer to the designated broadcast date is judged as having higher similarity. As a result, a next episode of the designated drama program is given highest similarity.

After judging the drama program(s) with the same title in the above way, the second highest similarity is given to a drama program whose title differs from the designated title but which has the same person as the designated person.

Note that the similarity judgment based on the category of each segment can be conducted in the same manner as above. For instance, when a segment whose genre is "drama" is designated, higher similarity is given to another drama program which has a same person as the designated segment.

The similar program list 3110 is generated in descending order of similarity (step S76).

Though the similarity is judged in accordance with the order of elements in the above example, a point may be assigned to each element so that the similarity is judged by a total point. As one example, five points are given to a program which has the same title as the designated title, three points are given to a program which has the same person as the designated person, and a program with a higher total point is judged as having higher similarity.

Also, the similar program list 3110 generated in this way may be subjected to a further search using the viewer-related condition as in the first embodiment.

Modifications

Although the program selection support device according to the present invention has been described by way of the embodiments, the present invention is not limited to the above, as the embodiments can partly be modified as follows.

(1) The above embodiments describe an example where the number of viewers is one for the sake of convenience, but the number of viewers may be more than one as in a case where family members are watching a television together.

In such a case, a search for similar programs is performed using a condition that combines conditions relating to a plurality of viewers. For example, programs of a frequently viewed genre common to all viewers are selected as similar programs.

Also, it is necessary to provide an input means for identifying each viewer, such as a means of selecting from a family member list screen.

(2) The first embodiment describes the case of performing the similarity judgment in consideration of viewer-related information, and the second embodiment describes the case of performing the similarity judgment using an algorithm that differs depending on a category of a program. It should be obvious that these similarity judgments can be used in combination.

For instance, the similarity judgment may be performed first in consideration of viewer related information and then using an algorithm corresponding to a category of a program.

Also, when performing the similarity judgment, the viewer-related information may be taken into consideration in weighting of each element and feature in program information.

Figure 20:
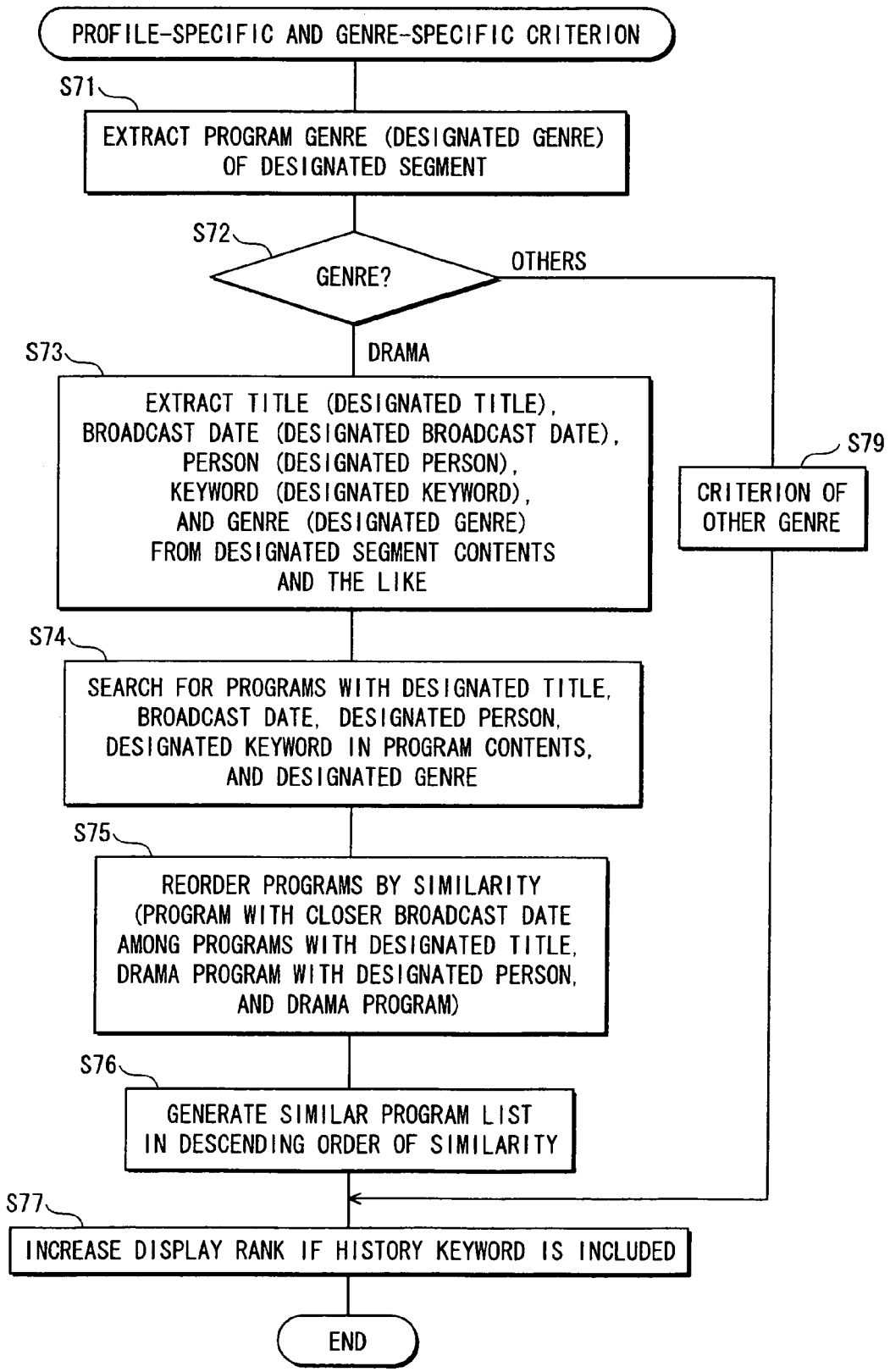
FIG. 20 is a flowchart showing an operation of using a profile-specific criterion and a genre-specific criterion.

FIG. 20 shows an example of similarity criterion based on both a category and a profile.

Figure 19:
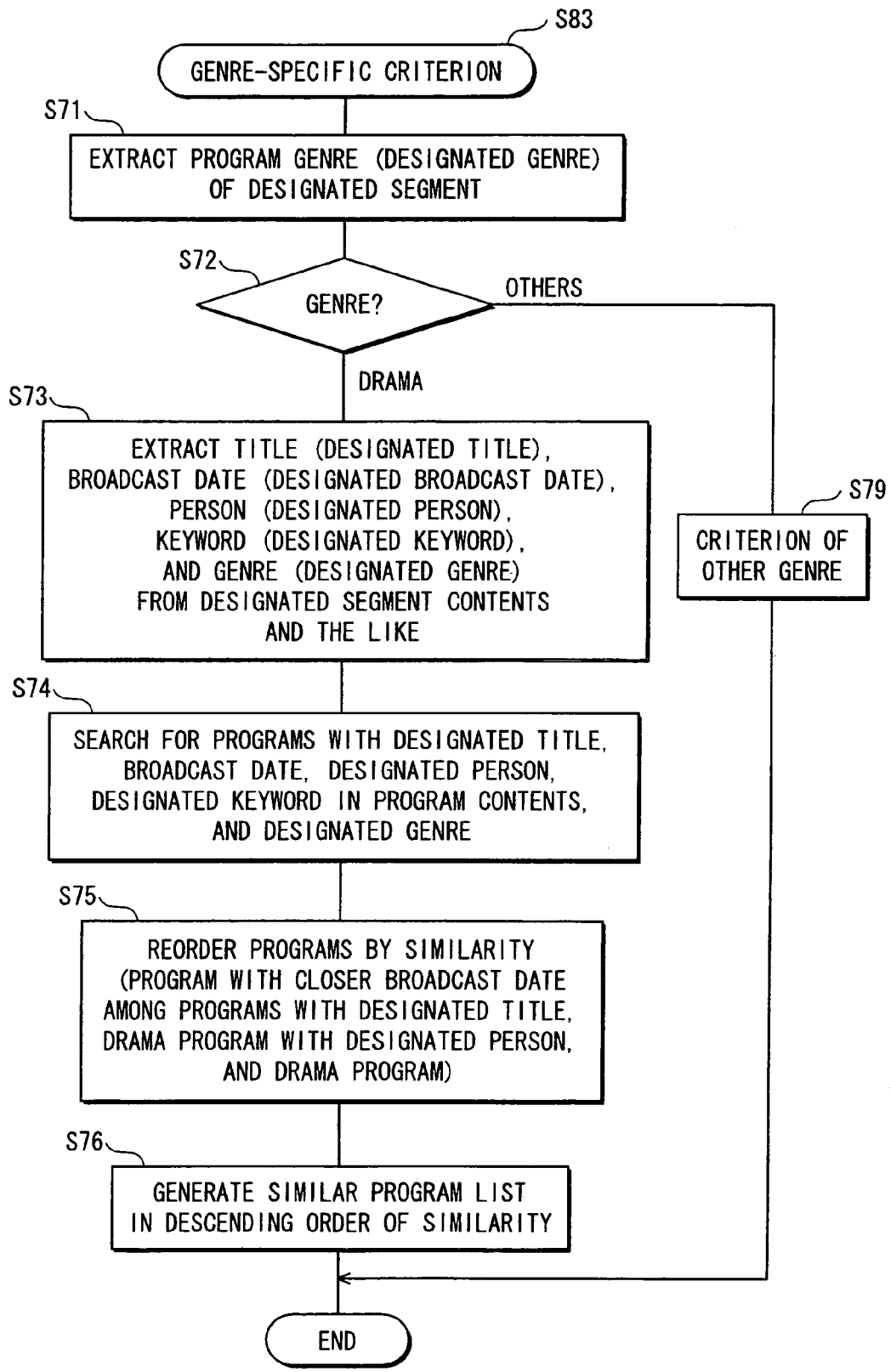
FIG. 19 is a flowchart showing an example operation for a genre-specific criterion.

In this example, first a search is performed for similar programs according to a genre (steps S71-S76), in the same way as in FIG. 19.

After this, a program including a history keyword in program information or the like is judged as having higher similarity, and the similar program list 3110 generated in step S76 is modified so as to increase a display position of the program (step S77).

As a result of such a similarity judgment, programs which are more desired by the viewer can be presented.

(3) The above embodiments describe the case where a program including a segment similar to the designated segment is set as a similar program, but a program similar to the designated program may be set as a similar program.

In this case, when the viewer designates a program, a search is performed for programs similar to the designated program. The program contents 9108 are used for this similarity judgment instead of the segment comment 9203.

(4) The first embodiment describes the case where the similarity judgment is performed firstly based on the program information and then using the viewer-related condition, but other similarity judgment algorithms may be used.

For example, though the algorithm for judging similarity between programs based on the program information as in the embodiments will not be varied according to the viewer-related condition, a similarity judgment algorithm may be varied according to the viewer-related condition.

As one example, keywords or weights assigned to keywords may be varied according to the viewer-related condition.

One example of this is given below. Suppose, in a case where programs are movies, the viewer's favorite actor in movies by director A is actor X, and the viewer's favorite actor in movies by director B is actor Y (this condition needs to be recorded in the profile). This being the case, even when the designated program features actor X, if that movie is directed not by director A but by director B, a weight assigned to actor X is reduced, so that a program featuring actor X will not necessarily be selected as a similar program.

Thus, the similarity judgment algorithm is varied according to the viewer-related condition in which the viewer prefers different actors depending on director. Accordingly, even if a program features the same actor as the designated program, whether or not the program is selected as a similar program depends on who directed the movie.

(5) The above embodiments describe the case where the viewer designates a program being played back by instructing to display the similar program list screen 3100 during the playback of the program. Alternatively, the viewer may designate a program not being played back.

For instance, a list of program titles or program thumbnails may be displayed so that the viewer designates a program or a segment on the display.

Also, the viewer may designate a plurality of programs or segments.

In such a case, information such as program information that corresponds to all designated programs is used to search for similar programs.

Figure 21:
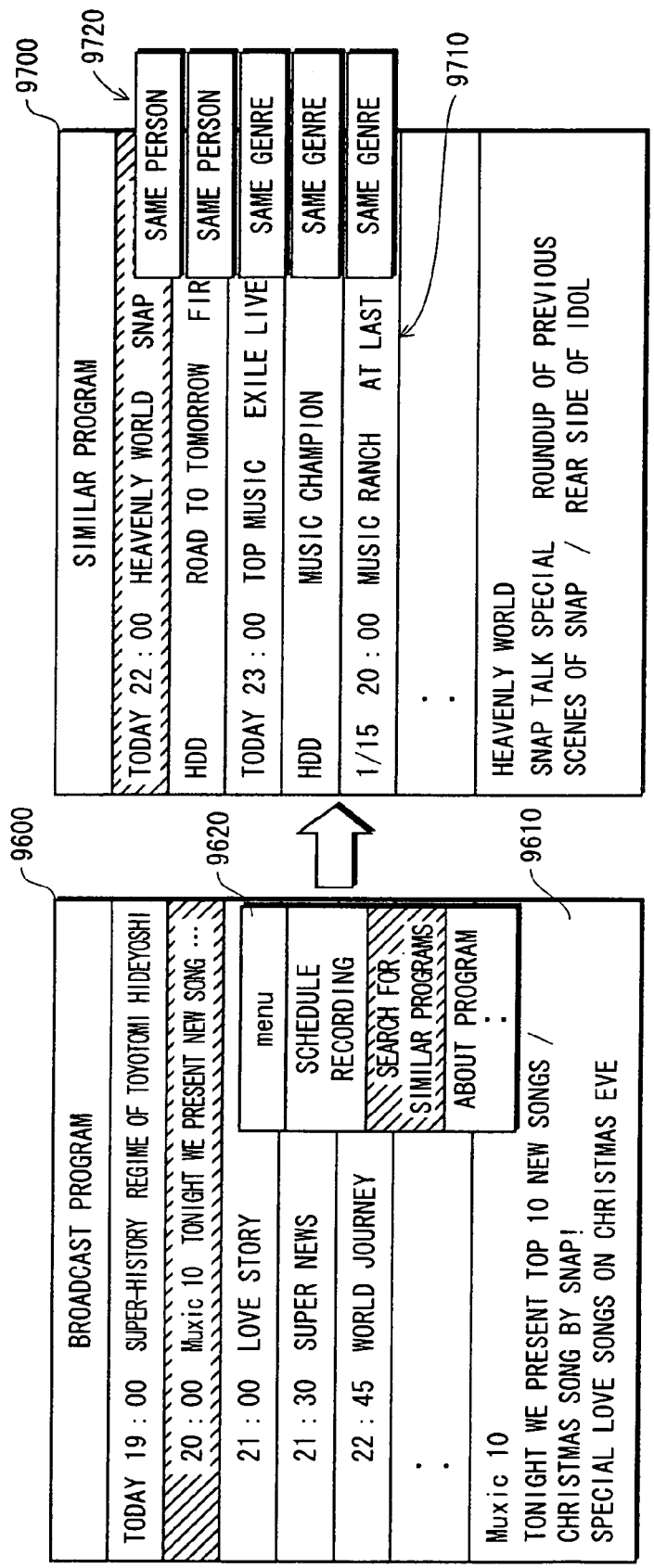
FIG. 21 shows an example of displaying a similar program list and similarity reasons from a program list screen.

FIG. 21 shows an example of displaying a program title list for designating a program.

When the viewer designates a program on a program list 9600, a similar program list 9700 appears on the screen. The designation of the program can be performed by moving a cursor on the program list 9600 and selecting "search for similar programs" on a pop-up menu 9620.

In the example shown in FIG. 21, the viewer designates "Muxic 10 . . . " on the program list 9600. The lower part of the program list 9600 has a window 9610 for displaying the contents of the program to which the cursor has been moved, i.e. the contents of "Muxic 10 . . . ".

When the viewer designates "Muxic 10 . . . ", the similar program list 9700 is displayed to show similar programs 9710. Reasons 9720 for similarity are displayed along with the similar programs 9710. For example, "Heavenly World . . . " is selected as a similar program on the ground that it has the same person, i.e. "SNAP", as "Muxic 10 . . . ".

This can be done by the similar program search unit 2200 recording these reasons at the time of similarity judgment and requesting the similar program display unit 2100 to display the reasons together with the similar program list 3110.

Figure 22:
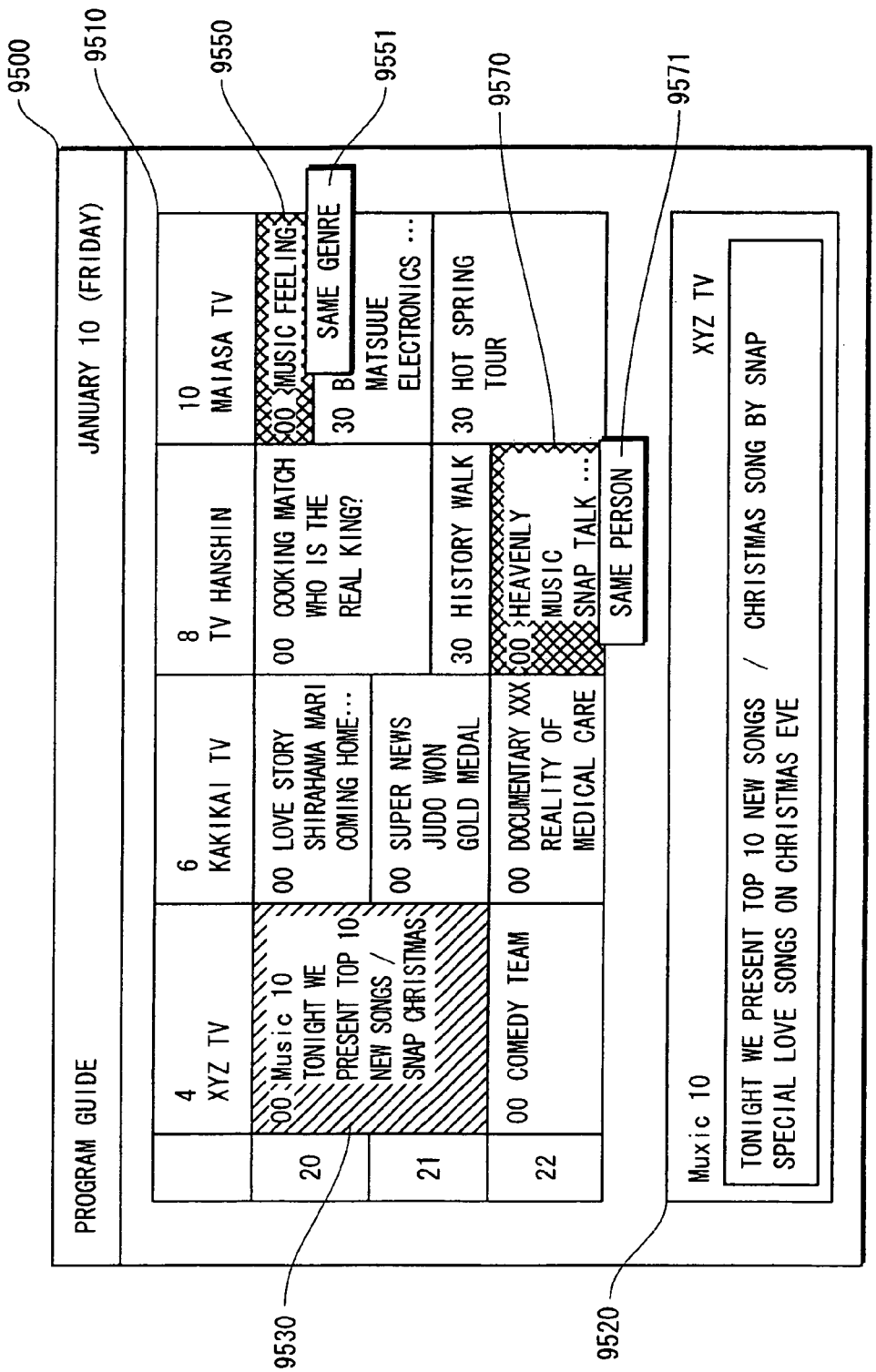
FIG. 22 shows an example of presenting similar programs on a program guide.

FIG. 22 shows an example of designating a program on an EPG and displaying similar programs.

An EPG screen 9500 is made up of a program guide 9510 and a window 9520 for showing the contents of a program. When the viewer designates a program, programs similar to this program are changed in display state. The designation of the program can be performed by moving a cursor and pressing a button to display similar programs.

In the example shown in FIG. 22, the viewer designates a program 9530 "Muxic 10 . . . ", so that the contents of this program are displayed on the window 9520. Also, programs "Music Feeling" and "Heavenly Music . . . " which are similar to the designatedprogram "Muxic 10 . . . " (9550 and 9570) are changed in color, to show that these are the similar programs of the designated program "Muxic 10 . . . ". Reasons for selecting these similar programs, namely, a reason 9551 "same genre" and a reason 9571 "same person" are displayed too.

In this example, the similar programs are displayed in a color different from the other programs, but other display methods may be used such as encircling by a thick-line box or using a different character font. Also, different colors may be used for the similar programs (9550, etc.) depending on their similarity reasons. Further, different colors may be used for the similarity reasons (9551, etc.) depending on their contents.

(6) The above embodiments describe the case where, when the viewer-related condition is the profile type of the viewer, programs highly evaluated by other viewers of the same profile type as the viewer are selected as similar programs. As a method of this evaluation, a program with a larger number of fun button presses is regarded as being more highly evaluated.

However, the program may instead be evaluated based on the number of viewers who schedule-recorded the program, the number of viewers who played the program, or the like.

In this case, it is necessary to transmit not information about the number of fun button presses but information about schedule-recorded programs and played programs from a recording/playback device 1000 to a service provision device 5000 and collect and manage such information in the service provision device.

The use of the number of viewers who schedule-recorded the program has an advantage that the program can be evaluated even when the program has not been broadcast in any area yet.

(7) A program which causes a CPU to execute each control procedure (such as the one shown in FIG. 3) for achieving each function of the program selection support device described in the above embodiments may be distributed having been stored on a recording medium or via a communication path. Examples of the recording medium include an IC card, an optical disc, a flexible disk, a ROM, and a flash memory. The distributed program is stored in a CPU readable memory or the like in a device and submitted to use. Each function of the program selection support device described in the above embodiments can be realized by the CPU executing this program.

<Ranking Information Generation Method>

An example method of generating the ranking information 1710 is described below, with reference to FIGS. 23 to 31.

The following system is produced to generate the ranking information 1710. The system collects evaluations of programs by many viewers and profiles which include personal information and viewing tendencies of the viewers, and selects programs that suit preferences of a viewer based on the collected evaluations and profiles.

In detail, the system generates the ranking information by selecting, as recommendations to a viewer, programs having high rates of being found interesting by other viewers who have similar profiles to the viewer.

Such a system is hereafter referred to as a "program selecting system".

Figure 23:
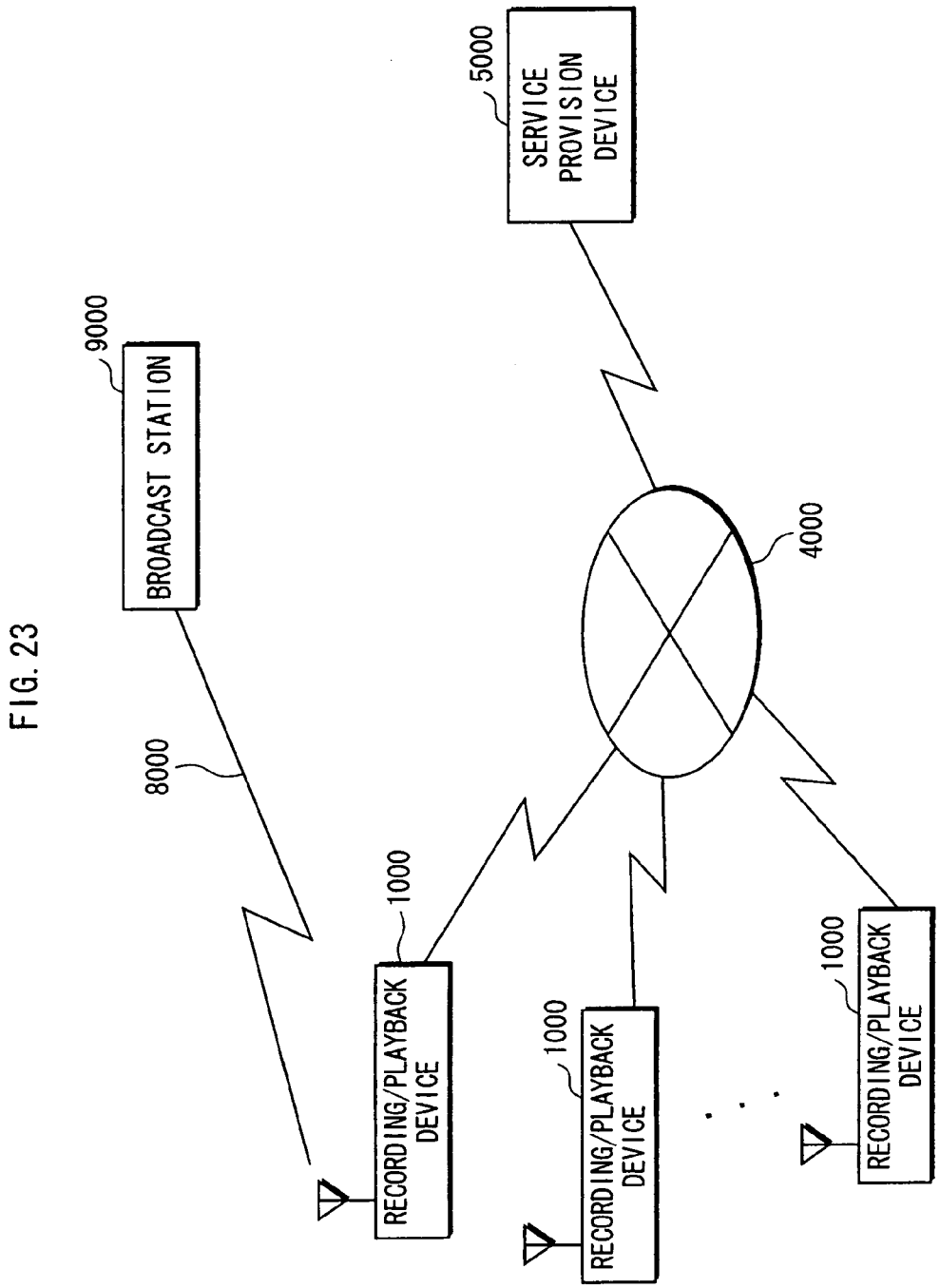
FIG. 23 shows an overall program selecting system.

FIG. 23 shows the overall program selecting system.

Each of a plurality of recording/playback devices 1000 is a personal recording/playback device intended for home use. The recording/playback device 1000 receives a signal 8000 from a broadcast station 9000, and performs an operation such as recording. The recording/playback device 1000 has a network function, in addition to a general recording/playback function.

Also, the recording/playback device 1000 includes a display for displaying a program.

The service provision device 5000 acts as a server device in the program selecting system. The service provision device 5000 has functions such as collecting data from the plurality of recording/playback devices 1000 which act as clients in the program selecting system, conducting operations such as management and processing of the collected data, and transmitting data in response to a request from any of the plurality of recording/playback devices 1000.

The plurality of recording/playback devices 1000 are connected to the service provision device 5000 via a network 4000.

The ranking information 1710 is generated by a ranking information extraction unit 5600 in the service provision device 5000 in response to a request from the recording/playback device 1000, and transmitted to the recording/playback device 1000.

This request is made by designating a broadcast time period. For example, when a time period of 30 days before or after today is designated, programs which were broadcast or are scheduled to be broadcast in 30 days before or after today are subjected to the generation of the ranking information 1710.

Figure 24:
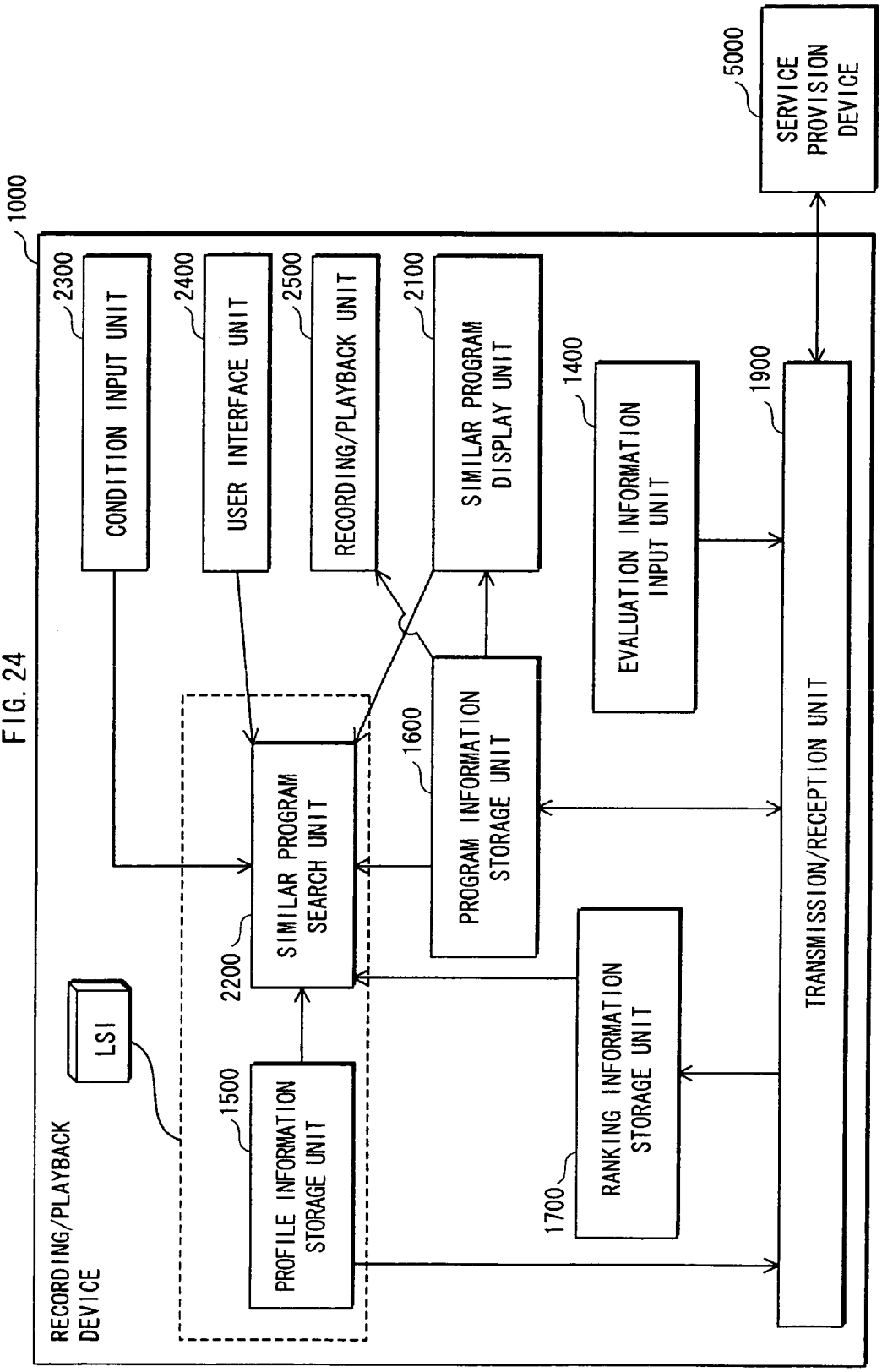
FIG. 24 is a functional block diagram showing a construction of a recording/playback device 1000.

FIG. 24 is a functional block diagram showing a construction of the recording/playback device 1000.

The recording/playback device 1000 includes the similar program display unit 2100, the similar program search unit 2200, the condition input unit 2300, the user interface unit 2400, the recording/playback unit 2500, an evaluation information input unit 1400, the profile information storage unit 1500, the program information storage unit 1600, the ranking information storage unit 1700, and the transmission/reception unit 1900.

Each function of the recording/playback device 1000 can be realized by a CPU executing a program stored on a memory or a hard disk (not illustrated) in the recording/playback device 1000.

The recording/playback device 1000 has a function of storing the program viewing history of the viewer and updating the profile of the viewer according to the program viewing history, and a function of automatically selecting and schedule-recording a program which suits the preferences of the viewer based on the profile. Note that these functions are not shown in the drawing.

The functions of each functional unit are substantially the same as those in the recording/payback device 2000 shown in FIG. 3, except only for the addition of the evaluation information input unit 1400.

The evaluation information input unit 1400 has a function of receiving an input of an evaluation by the viewer on a program which is being played back.

Various evaluation input methods are available, such as using a dedicated external button device attached to the recording/playback device 1000. In this embodiment, the viewer inputs his/her evaluation by pressing a specific key on the television remote control.

Also, various types of evaluations are available. In this embodiment, a high evaluation of a program by the viewer is used as the evaluation. For example, when the viewer finds the program interesting or valuable, he/she presses a corresponding key. Here, if the viewer finds the program more interesting, he/she presses the key more times.

The transmission/reception unit 1900 has a function of transferring data with the service provision device 5000 which is an external device.

Figure 25:
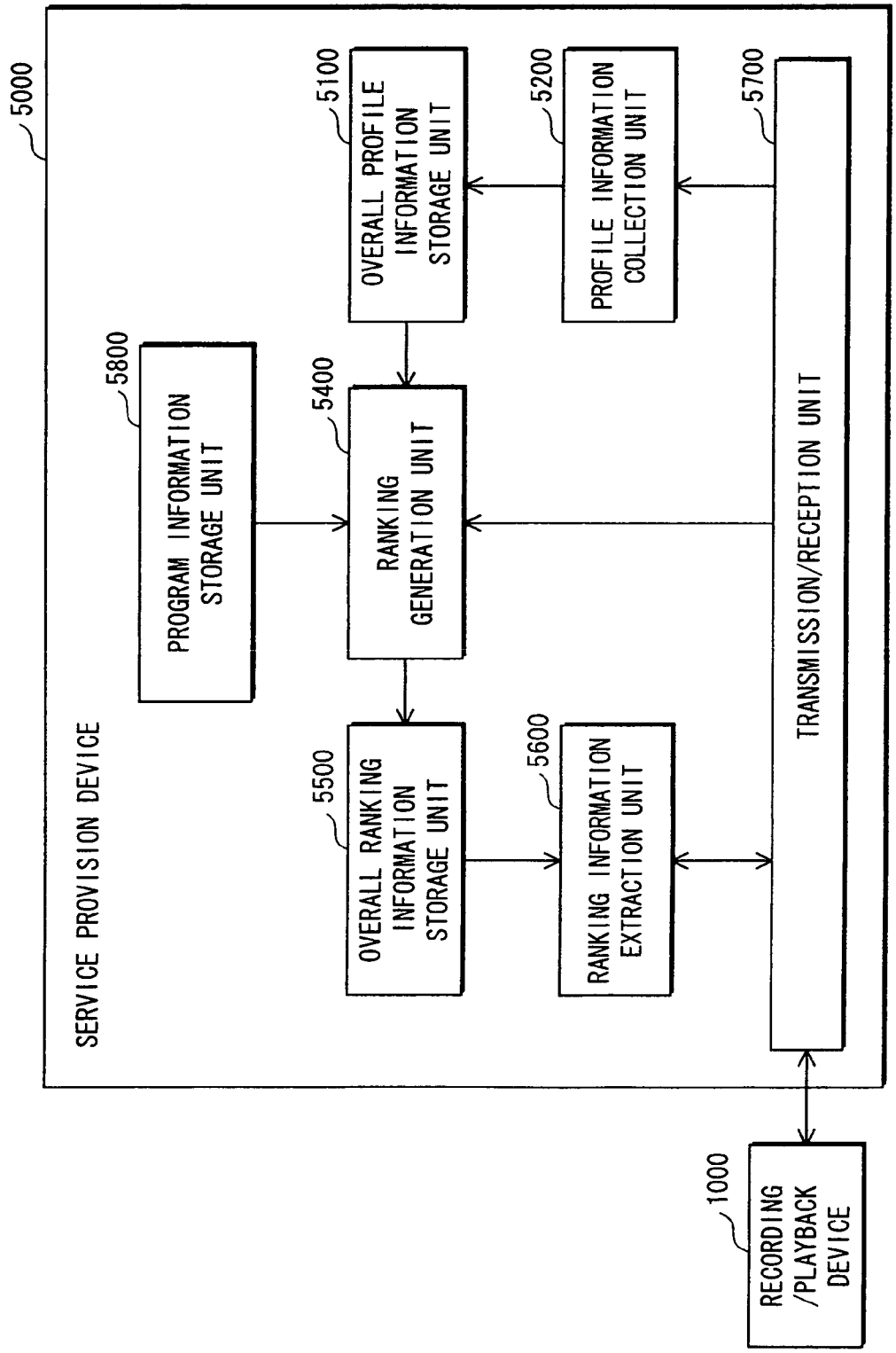
FIG. 25 is a functional block diagram showing a construction of a service provision device.

FIG. 25 is a functional block diagram showing a construction of the service provision device 5000.

The service provision device 5000 includes an overall profile information storage unit 5100, a profile information collection unit 5200, a ranking generation unit 5400, an overall ranking information storage unit 5500, a ranking information extraction unit 5600, a program information storage unit 5800, and a transmission/reception unit 5700.

Each function of the service provision device 5000 can be realized by a CPU executing a program stored on a memory or a hard disk (not illustrated) in the service provision device 5000.

The following explains each of the storage units. Details of information stored in these storage units will be explained later.

Figure 27:
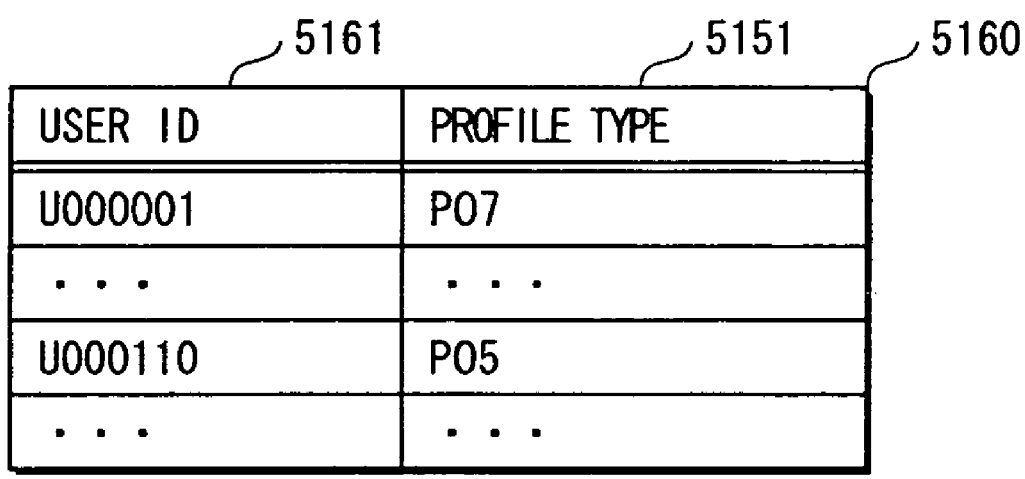
FIG. 27 shows a structure and a specific example of a profile type list.

The overall profile information storage unit 5100 has a function of storing the profile information 1510 (see FIG. 8) of every viewer, profile type information 5150 (see FIG. 26), and a profile type list 5160 (see FIG. 27).

The profile information 1510 stored in the overall profile information storage unit 5100 is identical to the profile information stored in the profile information storage unit 1500 in the recording/playback device 1000. The difference from the recording/playback device 1000 is that, while the recording/playback device 1000 stores one set of profile information of the viewer of the recording/playback device 1000, the service provision device 5000 stores a plurality of sets of profile information of all viewers.

The profile type information 5150 is a table for classifying profiles into profile types according to their characteristics. Each viewer is classified into one of the profile types corresponding to his/her profile.

The profile type list 5160 is a table showing a correspondence between a user ID for identifying each viewer and a profile type of the viewer.

The program information storage unit 5800 has a function of storing the program information 9100 that is transmitted from the broadcast station 9000 in regard to programs which are scheduled to be broadcast, and the segment information 9200 of each program.

The program information 9100 and the segment information 9200 stored in the program information storage unit 5800 are the same as the program information and the like stored in the program information storage unit 1600 in the recording/playback device 1000.

The overall ranking information storage unit 5500 has a function of storing overall ranking information 5510 which shows evaluations of all programs.

This overall ranking information 5510 includes viewers' evaluations of all programs which have been broadcast and evaluations of segments included in the programs.

The profile information collection unit 5200 has a function of updating, when the profile information 1510 is transmitted from the recording/playback device 1000, profile information in the overall profile information storage unit 5100 that has a same userID as the received profile information 1510. In detail, the profile information collection unit 5200 judges which profile type a new profile belongs to, and modifies the profile information 1510 and the profile type list 5160.

Here, the profile information is transmitted from the recording/playback device 1000 when the profile information stored in the profile information storage unit 1500 in the recording/playback device 1000 is updated. In the recording/playback device 1000, the profile information is updated either automatically based on the viewing history or when instructed by the viewer.

The ranking generation unit 5400 has a function of generating the overall ranking information 5510 based on evaluation information 1410 (see FIG. 28) transmitted from the recording/playback device 1000.

In detail, the ranking generation unit 5400 combines evaluations of each program segment into a total according to profile type, and writes an evaluation total to the overall ranking information storage unit 5500.

The ranking information extraction unit 5600 has a function of extracting information from the overall ranking information storage unit 5500 in response to a request from the recording/playback device 1000, and transmitting the extracted information to the recording/playback device 1000.

This request from the recording/playback device 1000 can be made by, for example, specifying a broadcast time period, a program genre, or a profile. In this embodiment, the request is made by specifying a broadcast time period.

The transmission/reception unit 5700 has a function of transferring data with the recording/playback device 1000.

The following explains main data used in the program selecting system, with reference to FIGS. 26 to 29.

FIG. 26 shows a structure and a specific example of the profile type information.

The profile type information 5150 shows a criterion for classifying profiles of viewers into profile types. In this embodiment, 20 profile types are provided.

The profile type information 5150 is made up of a profile type 5151 and an item 5152. As one example, the profile type "P01" corresponds to sex "female", an age group "20-29", and a most frequently recorded program genre "society/report".

The reason for classifying each viewer into these profile types is to select programs which viewers having similar profiles find interesting.

The profile type information 5150 is stored only in the overall profile information storage unit 5100 in the service provision device 5000.

FIG. 27 shows a structure and a specific example of the profile type list.

The profile type list 5160 shows a correspondence between a user ID 5161 of each viewer and the profile type 5151.

For example, when the viewer transmits an evaluation of a program, the profile type list 5160 is used to specify the profile type of the viewer.

The profile type list 5160 is stored only in the overall profile information storage unit 5100 in the service provision device 5000.

Figure 28:
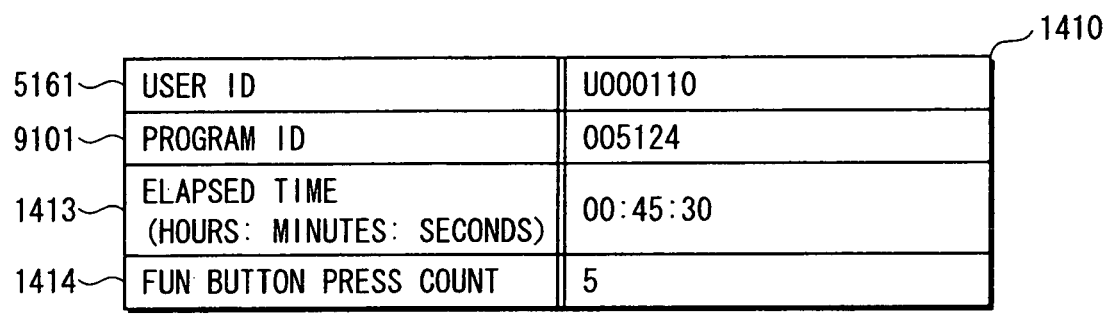
FIG. 28 shows a structure and a specific example of evaluation information.

FIG. 28 shows a structure and a specific example of the evaluation information.

The evaluation information 1410 is transmitted from the recording/playback device 1000 to the service provision device 5000, when the evaluation information input unit 1400 in the recording/playback device 1000 receives an evaluation from the viewer, that is, when the viewer finds a currently viewed program interesting and presses the corresponding key on the remote control.

The evaluation information 1410 is made up of a user ID 5161, a program ID 9101, an elapsed time 1413, and a fun button press count 1414.

The user ID 5161 is a number for identifying the viewer, and indicates the person who pressed the fun button while watching the program.

The program ID 9101 is a number for identifying the program, and indicates the program which is being played back when the fun button is pressed.

The elapsed time 1413 is a time relative to a playback start time of the program identified by the program ID 9101, i.e. the program which is being played back. The elapsed time 1413 is referenced when specifying a segment in the program.

The fun button press count 1414 shows a number of times the viewer identified by the user ID 5161 presses the button. If an interval between presses is within a predetermined time, these presses are counted cumulatively. A cumulative total of presses is calculated and the program is ranked according to the cumulative total.

In the case of FIG. 28, the viewer identified by the user ID "U000110" presses the fun button "5" times when "00:45:30", i.e. 45 minutes and 30 seconds, has elapsed from the start of the program identified by the programID "005124".

FIG. 29 shows a structure and a specific example of the overall ranking information.

The overall ranking information 5510 totalizes the numbers of presses of the fun button during playback of a segment of a program, for each profile type.

The overall ranking information 5510 is made up of a profile type 5151 and a program ID/segment number 5512.

As one example, during the playback of the segment identified by the segment number "001" in the program identified by the program ID "000111", the viewers of the profile type "P01" pressed the fun button a total of "3200" times and the viewers of the profile type "P02" pressed the fun button a total of "30" times. This indicates that the viewers of the profile type "P01" found the segment more interesting than the viewers of the profile type "P02".

The overall ranking information 5510 is stored only in the overall ranking information storage unit 5500 in the service provision device 5000.

Here, since the fun button press count keeps increasing as time passes from the broadcasting of the program, the information about the program is removed from the overall ranking information once a predetermined time period has elapsed from the broadcasting of the program. In this embodiment, the predetermined time period is one month.

Operations of the program selecting system having the above construction are described below, with reference to FIGS. 30 and 31.

Figure 30:
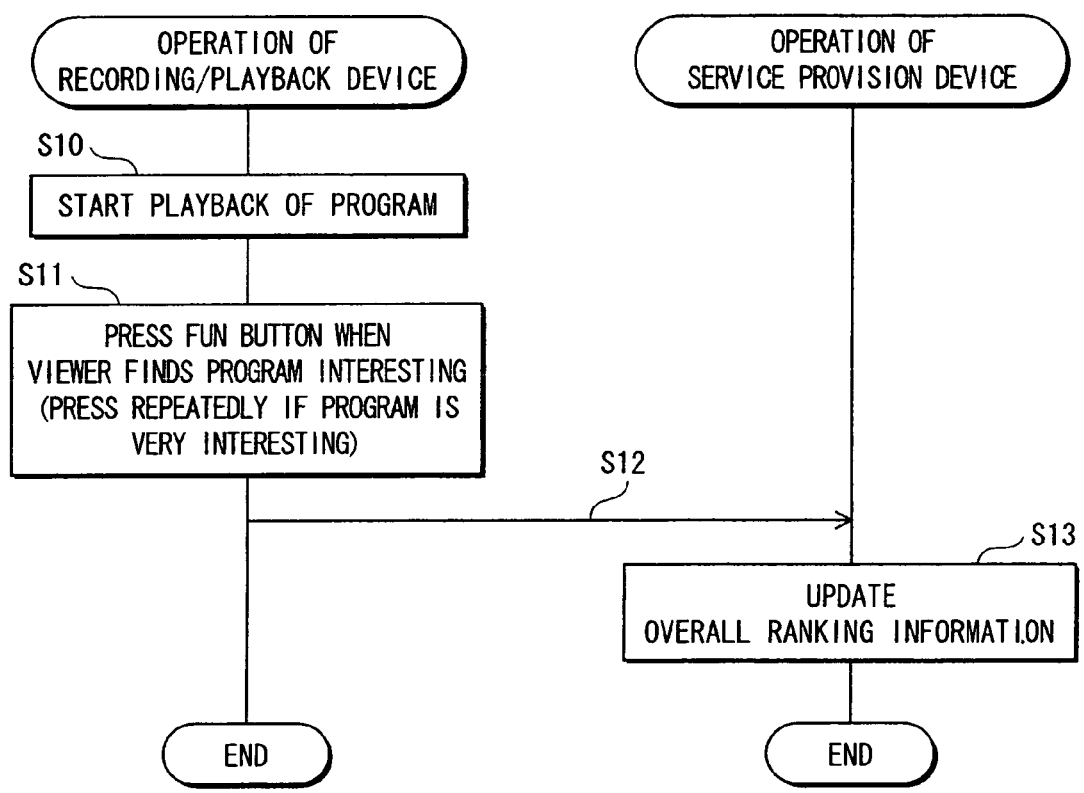
FIG. 30 is a flowchart showing an operation of reflecting the viewer's fun button presses, onto program ranking.

FIG. 30 shows an operation of reflecting the viewer's presses of the fun button onto program ranking.

This operation is performed when each viewer presses the fun button. The numbers of presses of the fun button are combined into a total for each program and for each segment.

The recording/playback device 1000 starts playback of a program (step S10). The playback mentioned in this embodiment includes not only an operation of playing a recorded program but also an operation of receiving a program which is being broadcast and playing the received program.

The viewer watches the program which is being played, and presses the fun button on the remote control when he/she finds the program interesting (step S11).

Upon detecting the press of the fun button, the evaluation information input unit 1400 generates the evaluation information 1410 (see FIG. 28). Here, the user ID 5161 is set to the user ID of the profile information 1510 stored in the profile information storage unit 1500. The program ID 9101 is set to a program ID which is specified using a current date and time and a channel from the program information 9100 stored in the program information storage unit 1600. The elapsed time 1413 is set to a difference between the current time and the broadcast start time 9103 in the program information 9100. The fun button press count 1414 is set to a total number of presses within the predetermined time.

Having generated the evaluation information 1410, the evaluation information input unit 1400 transmits the generated evaluation information 1410 to the service provision device 5000 via the transmission/reception unit 1900 (step S12).

The service provision device 5000 receives the evaluation information 1410 from the recording/playback device 1000, and passes the received evaluation information 1410 to the ranking generation unit 5400 through the transmission/reception unit 5700.

The ranking generation unit 5400 receives the evaluation information 1410, and updates the overall ranking information 5510 stored in the overall ranking information storage unit 5500 based on the received evaluation information 1410 (step S13, see FIG. 30).

First, the ranking generation unit 5400 specifies the profile type 5151 using the user ID 5161 in the evaluation information 1410. To do so, the ranking generation unit 5400 references the profile type list 5160 stored in the overall profile information storage unit 5100. In the example, the user ID 5161 is "U000110", so that the profile type 5151 is "P05".

Next, the ranking generation unit 5400 specifies a segment number from the program ID 9101 and the elapsed time 1413 in the evaluation information 1410. To do so, the ranking generation unit 5400 references the program information 9100 and the segment information 9200 stored in the program information storage unit 5800. In the example, the elapsed time 1413 from the start of the program identified by the program ID "005124" is "00:45:30". With reference to the segment start time 9202 in the segment information 9200, the segment number 9201 corresponding to the elapsed time of 45 minutes and 30 seconds is "002".

Accordingly, the ranking generation unit 5400 adds the fun button press count 1414 "5" in the evaluation information 1410 to the field with the profile type 5151 "P05", the program ID "005124", and the segment number "002" in the overall ranking information 5510. As a result, the corresponding value is changed from "350" to "355".

Figure 31:
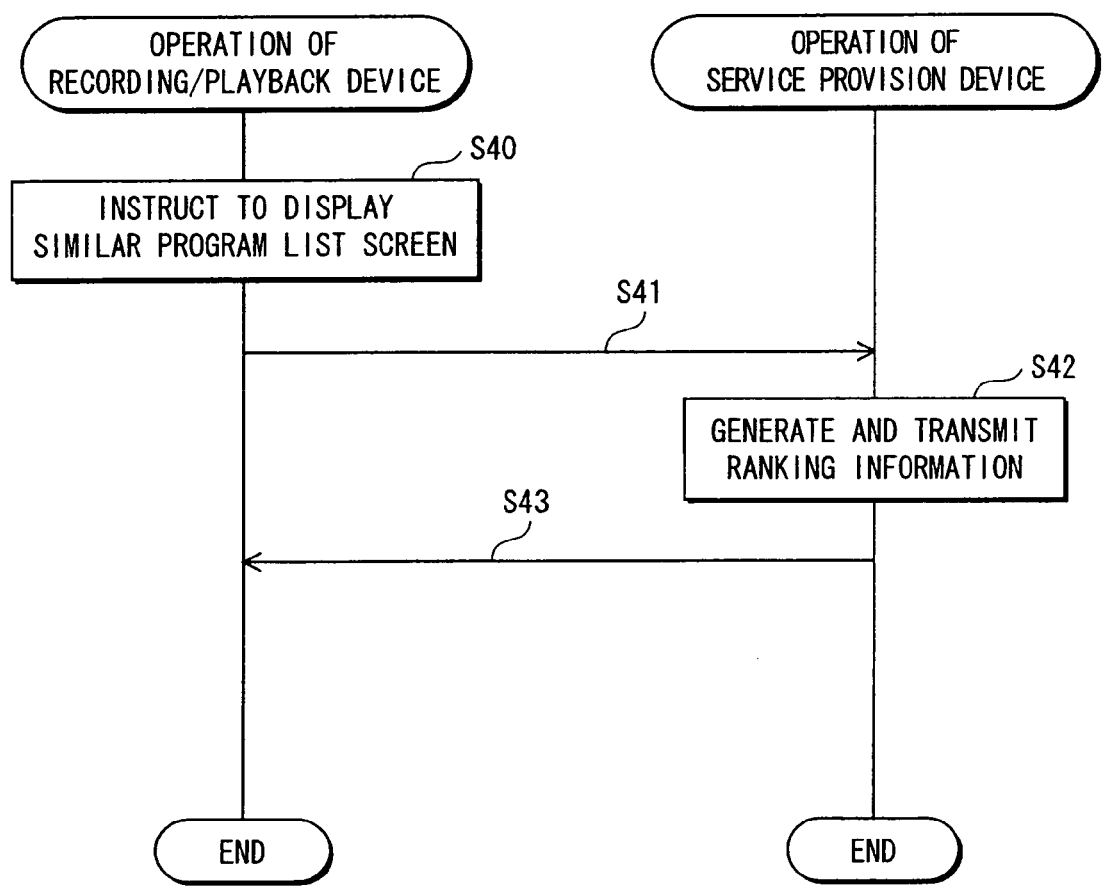
FIG. 31 is a flowchart showing an operation of generating and transmitting ranking information by a service provision device 5000 in response to a request from the recording/playback device 1000.

FIG. 31 shows an operation of the service provision device 5000 generating and transmitting the ranking information in response to a request from the recording/playback device 1000.

First, the viewer instructs the recording/playback device 1000 to display the similar program list screen 3100 (step S40) by, for example, pressing a corresponding button on the remote control.

Upon receiving the instruction to display the similar program list screen 3100, the recording/playback device 1000 transmits a request to transmit the ranking information 1710 (see FIG. 12), to the service provision device 5000 via the transmission/reception unit 1900 (step S41). When transmitting the ranking information 1710 transmission request, the recording/playback device 1000 designates a time period. For example, if today is March 10, the recording/playback device 1000 designates a time period from February 11 to March 17. The time period used here may be fixed or may be determined by the viewer.

Having received the ranking information 1710 transmission request from the recording/playback device 1000 through the transmission/reception unit 5700, the service provision device 5000 requests the ranking information extraction unit 5600 to extract programs.

Upon receiving the extraction request, the ranking information extraction unit 5600 specifies, for each profile type program shaving high fun button press counts and segments having high fun button press counts in the programs, in the overall ranking information 5510 (see FIG. 29) stored in the overall ranking information storage unit 5500.

The ranking information extraction unit 5600 organizes program IDs of the programs and segment numbers of the segments specified in this way, to generate the ranking information 1710 (step S42).

When doing so, the ranking information extraction unit 5600 includes, in the ranking information 1710, only the programs which are broadcast in the time period designated in the ranking information 1710 transmission request from the recording/playback device 1000. This judgment is made using the program information 9100 (see FIG. 6) stored in the program information storage unit 5800. In the case of the program identified by the programID "005124" as one example, the broadcast date of the program is "2004/03/10", so that the ranking information extraction unit 5600 includes this program in the ranking information 1710.

The ranking information extraction unit 5600 also calculates the segment start time 1713 and writes it to the ranking information 1710. The segment start time 1713 is calculated by adding the segment start time 9202 (see FIG. 7) to the broadcast start time 9103.

The service provision device 5000 transmits the ranking information 1710 generated by the ranking information extraction unit 5600, to the recording/playback device 1000 (step S43).

Upon receiving the ranking information 1710 from the service provision device 5000, the recording/playback device 1000 passes the received ranking information 1710 to the ranking information storage unit 1700 to have the ranking information 1710 stored therein.

The ranking information storage unit 1700 stores the received ranking information 1710.

INDUSTRIAL APPLICABILITY

The present invention provides a technique that is useful not only for easily finding programs suited to the viewer but also for enabling the viewer not to forget to watch programs recorded in the past.

The invention claimed is:

1. A program selection support device comprising:
a program information acquisition unit operable to acquire program information for a plurality of programs, the program information comprising constituent elements used for a predetermined similarity judgment;
a display unit operable to display a program guide, such that parts of the program guide showing the plurality of programs are arranged in a matrix on one screen, the program guide being displayed based on the program information of the plurality of programs acquired by the program information acquisition unit;
a program designation unit operable to designate a program from the plurality of programs in the program guide displayed by the display unit;
a category acquisition unit operable to acquire a category, which is determined based on the program information acquired by the program information acquisition unit, and to which the designated program belongs;
a determination unit operable to determine an algorithm used for the predetermined similarity judgment, based on the category acquired by the category acquisition unit;
a search unit operable to search the plurality of programs for programs similar to the program designated by the program designation unit, using the algorithm determined by the determination unit, with reference to the program information acquired by the program information acquisition unit; and
a criterion storage unit operable to store, for each respective category, criterion information that indicates (i) constituent elements in the program information that are used for the predetermined similarity judgment of a program in the respective category and (ii) an importance of each of the constituent elements, wherein
the determination unit determines the algorithm used for the predetermined similarity judgment that is based on the category acquired by the category acquisition unit, based on the criterion information of the category acquired by the category acquisition unit,
the display unit changes how the display unit displays first parts and second parts of the program guide, such that the first parts are displayed differently from the second parts while relative portions, on the displayed program guide, of the parts showing the plurality of programs are maintained, the first parts being parts of the program guide that show the programs found by the search unit, and the second parts being remaining parts of the program guide that show other programs, and
the criterion storage unit stores, for each respective category, a different combination of constituent elements used for the predetermined similarity judgment, such that the importance of each of the constituent elements is different for each respective category.

2. The program selection support device of claim 1, wherein the program information acquired by the program information acquisition unit is information created by a producer of the program.

3. The program selection support device of claim 1, further comprising:
a recording unit operable to record any of the plurality of programs, wherein
the display unit displays recording information indicating which of the programs have been recorded, together with program identification information for identifying all of the programs found by the search unit, when any of the programs have been recorded by the recording unit.

4. The program selection support device of claim 1, wherein
the search unit further extracts, for each of the programs found by the search unit, a reason why a found program is similar to the program designated by the program designation unit, and
the display unit displays information showing the reason, together with program identification information for identifying all of the programs found by the search unit.

5. The program selection support device of claim 1, further comprising:
a viewer information acquisition unit operable to acquire viewer information relating to a viewer, wherein
the determination unit determines the algorithm used for the predetermined similarity judgment based further on the viewer information acquired by the viewer information acquisition unit.

6. A non-transitory computer-readable recording medium having a program recorded thereon, the program causing a computer to execute a program search method comprising:
acquiring program information for a plurality of programs, the program information comprising constituent elements used for a predetermined similarity judgment;
displaying a program guide, such that parts of the program guide showing the plurality of programs are arranged in a matrix on one screen, the program guide being displayed based on the program information of the plurality of programs;
designating a program from the plurality of program in the program guide;
acquiring a category, which is determined based on the program information acquired by the acquiring of the program information, and to which the designated program belongs;
determining an algorithm used for the predetermined similarity judgment, based on the category acquired by the acquiring of the category;
searching the plurality of programs for programs similar to the designated program using the determined algorithm with reference to the acquired program information;
storing, for each respective category, criterion information that indicates (i) constituent elements in the program information that are used for the predetermined similarity judgment of a program in the respective category and (ii) an importance of each of the constituent elements; and changing how first parts and second parts of the program guide are displayed by the displaying of the program guide, such that the first parts are displayed differently from the second parts while relative positions, on the displayed program guide, of the parts showing the plurality of programs are maintained, the first parts being parts of the program guide that show the programs found by the searching, and the second parts being remaining parts of the program guide that show other programs, wherein the determining of the algorithm determines the algorithm used for the predetermined similarity judgment that is based on the category acquired by the acquiring of the category, based on the criterion information of the category acquired by the acquiring of the category, and the storing stores, for each respective category, a different combination of constituent elements used for the predetermined similarity judgment, such that the importance of each of the constituent elements is different for each respective category.

7. A program search method used in a program selection support device, the program search method comprising:

acquiring program information for a plurality of programs, the program information comprising constituent elements used for a predetermined similarity judgment;

displaying a program guide, such that parts of the program guide showing the plurality of programs are arranged in a matrix on one screen, the program guide being displayed based on the program information of the plurality of programs;

designating a program from the plurality of program in the program guide;

acquiring a category, which is determined based on the program information acquired by the acquiring of the program information, and to which the designated program belongs;

determining an algorithm used for the predetermined similarity judgment, based on the category acquired by the acquiring of the category;

searching the plurality of program for programs similar to the designated program using the determined algorithm with reference to the acquired program information;

storing, for each respective category, criterion information that indicates (i) constituent elements in the program information that are used for the predetermined similarity judgment of a program in the respective category and (ii) an importance of each of the constituent elements; and changing how first parts and second parts of the program guide are displayed by the displaying of the program guide, such that the first parts are displayed differently from the second parts while relative positions, on the displayed program guide, of the parts showing the plurality of programs are maintained, the first parts being parts of the program guide that show the programs found by the searching, and the second parts being remaining parts of the program guide that show other programs, wherein the determining of the algorithm determines the algorithm used for the predetermined similarity judgment that is based on the category acquired by the acquiring of the category, based on the criterion information of the category acquired by the acquiring of the category, and the storing stores, for each respective category, a different combination of constituent elements used for the predetermined similarity judgment, such that the importance of each of the constituent elements is different for each respective category.

8. An integrated circuit for a program selection support device, the integrated circuit comprising:

a program information acquisition unit operable to acquire program information for a plurality of programs, the program information comprising constituent elements used for a predetermined similarity judgment;

a display unit operable to display a program guide, such that parts of the program guide showing the plurality of programs are arranged in a matrix on one screen, the program guide being displayed based on the program information of the plurality of programs acquired by the program information acquisition unit;

a program designation unit operable to designate a program from the plurality of program in the program guide displayed by the display unit;

a category acquisition unit operable to acquire a category, which is determined based on the program information acquired by the program information acquisition unit, and to which the designated program belongs;

a determination unit operable to determine an algorithm used for the predetermined similarity judgment, based on the category acquired by the category acquisition unit;

a search unit operable to search the plurality of programs for programs similar to the program designated by the program designation unit, using the algorithm determined by the determination unit, with reference to the program information acquired by the program information acquisition unit; and a criterion storage unit operable to store, for each respective category, criterion information that indicates (i) constituent elements in the program information that are used for the predetermined similarity judgment of a program in the respective category and (ii) an importance of each of the constituent elements, wherein the determination unit determines the algorithm used for the predetermined similarity judgment that is based on the category acquired by the category acquisition unit, based on the criterion information of the category acquired by the category acquisition unit, the display unit changes how the display unit displays first parts and second parts of the program guide, such that the first parts are displayed differently from the second parts while relative positions, on the displayed program guide, of the parts showing the plurality of programs are maintained, the first parts being parts of the program guide that show the programs found by the search unit, and the second parts being remaining parts of the program guide that show other programs, and the criterion storage unit stores, for each respective category, a different combination of constituent elements used for the predetermined similarity judgment, such that the importance of each of the constituent elements is different for each respective category.

9. The program selection support device of claim 1, wherein each of the constituent elements in the program information that is used for the predetermined similarity judgment of the program in the category is one constituent element selected from a group consisting of a broadcast date, a broadcast start time, a broadcast end time, a broadcast station, a title, a program content, and a cast.

10. The program selection support device of claim 9, wherein
the program designated by the program designation unit is made up of a plurality of segments having different playback times,
the program information acquired by the program information acquisition unit further includes segment information for specifying each segment,
the program designation unit further designates segment information specifying a segment in the designated program,
the search unit searches for the programs that include segments similar to the segment specified by the segment information designated by the program designation unit using the algorithm determined by the determination unit, with reference to the program information acquired by the program information acquisition unit, and
the display unit displays program identification information for identifying the programs found by the search unit, and segment identification information for identifying the segments similar to the specified segment.

11. The program selection support device of claim 9, further comprising:
a recording unit operable to record any of the plurality of programs, wherein
the display unit displays recording information indicating which programs have been recorded, together with program identification information for identifying the programs found by the search unit, when any of the programs have been recorded by the recording unit.

12. The program selection support device of claim 1, further comprising:
a playback unit operable to play back any of the plurality of programs, wherein
the program designation unit further designates the program that is being played back by the playback unit, and
the display unit further displays program identification information for identifying the programs found by the search unit, in an order of similarity based on the similarity judgment using the algorithm determined by the determination unit.

13. The program selection support device of claim 12, further comprising:
a recording unit operable to record any of the plurality of programs, wherein
the playback unit causes the display unit to display video related to playback,
the display unit displays the program identification information in the order of similarity by overlaying the program identification information on at least part of the video, and if any of the programs identified by the program identification information has been recorded by the recording unit, displays the program identification information with recording information that indicates that the program has been recorded by the recording unit.

14. The program selection support device of claim 12, wherein
the program designated by the program designation unit is made up of a plurality of segments having different playback times,
the program information acquired by the program information acquisition unit further includes segment information for specifying each segment,
the program designation unit further designates segment information specifying a segment in the designated program,
the search unit searches for the programs that include segments similar to the segment specified by the segment information designated by the program designation unit using the algorithm determined by the determination unit, with reference to the program information acquired by the program information acquisition unit, and
the display unit displays the program identification information for identifying the programs found by the search unit, and segment identification information for identifying the segments similar to the specified segment.

15. The program selection support device of claim 5, further comprising:
a viewing history acquisition unit operable to acquire viewing history information showing which programs have been previously viewed by the viewer, wherein
the viewer information acquired by the viewer information acquisition unit is the viewing history information.

16. The program selection support device of claim 15, wherein
the viewing history information comprises genres of the viewed programs, and
the viewer information acquired by the viewer information acquisition unit shows a genre, among the genres in the viewing history information, which has been viewed by the viewer with a frequency higher than a predetermined frequency.

17. The program selection support device of claim 15, wherein
the viewing history information comprises keywords appearing in the program information of the viewed programs, and
the viewer information acquired by the viewer information acquisition unit shows a keyword, among the keywords in the viewing history information, which appears at least a predetermined number of times in the program information of the viewed programs.

18. The program selection support device of claim 5, further comprising:
a personal information acquisition unit operable to acquire personal information of the viewer, wherein
the viewer information acquired by the viewer information acquisition unit is the personal information.

19. The program selection support device of claim 18, wherein
the program information acquired by the program information acquisition unit further comprises language information for specifying a language used in a corresponding program,
the personal information acquired by the personal information acquisition unit comprises information about a language usable by the viewer, and
the viewer information acquired by the viewer information acquisition unit shows the language usable by the viewer.

20. The program selection support device of claim 18, wherein the determination unit determines the algorithm in accordance with a type based on the personal information of the viewer.

21. The program selection support device of claim 20, further comprising:
an evaluation acquisition unit operable to acquire evaluation information showing an evaluation of another viewer on each of the plurality of programs, wherein
the algorithm determined by the determination unit indicates that an evaluation of another viewer of a same type as the viewer is no less than a predetermined evaluation.

22. The program selection support device of claim 5, further comprising:
a location acquisition unit operable to acquire location information about a location of the program selection support device, wherein
the program information acquired by the program information acquisition unit further comprises area information specifying an area where a corresponding program is broadcast, and
the viewer information acquired by the viewer information acquisition unit shows whether the location shown by the location information acquired by the location acquisition unit belongs to the area specified by the area information.

23. The program selection support device of claim 5, wherein
the viewer information acquired by the viewer information acquisition unit is summarized viewer information obtained by summarizing the viewer information of each of the plurality of viewers, if the program selection support device has a plurality of viewers, and
the determination unit determines the algorithm used for the similarity judgment, based on the summarized viewer information.

24. The program selection support device of claim 5, wherein the algorithm determined by the determination unit is for searching for the programs similar to the program designated by the program designation unit using a predetermined algorithm based on the program information acquired by the program information acquisition unit and corresponding to the viewer information acquired by the viewer information acquisition unit.

* * * * *